US011882006B1

(12) United States Patent
Nesteroff et al.

(10) Patent No.: US 11,882,006 B1
(45) Date of Patent: Jan. 23, 2024

(54) USER INTERFACE FOR 5G RADIO ACCESS NETWORK (RAN) TOPOLOGY

(71) Applicant: Juniper Networks, Inc., Sunnyvale, CA (US)

(72) Inventors: Lyubov Nesteroff, Pleasant Hill, CA (US); Mengjiao Sun, Sunnyvale, CA (US); Bret Michael Bailey, Santa Cruz, CA (US); Ojas Gupta, Mountain View, CA (US); Burcu Sahin, Ankara (TR); Arda Akman, San Ramon, CA (US); Bengi Mizrahi, Istanbul (TR); Hongbin Xie, Mississauga (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/148,733

(22) Filed: Dec. 30, 2022

(51) Int. Cl.
| | |
|---|---|
| *H04L 41/22* | (2022.01) |
| *H04L 41/12* | (2022.01) |
| *G06F 3/04817* | (2022.01) |
| G06F 3/0482 | (2013.01) |

(52) U.S. Cl.
CPC .......... *H04L 41/22* (2013.01); *G06F 3/04817* (2013.01); *H04L 41/12* (2013.01); *G06F 3/0482* (2013.01)

(58) Field of Classification Search
CPC ..... H04L 41/22; H04L 41/12; G06F 3/04817; G06F 3/0482
See application file for complete search history.

(56) References Cited

U.S. PATENT DOCUMENTS

| | | | | |
|---|---|---|---|---|
| 2021/0314211 | A1* | 10/2021 | Grayson | ............. H04L 41/0213 |
| 2022/0167236 | A1* | 5/2022 | Melodia | ............ H04W 28/0236 |
| 2022/0345484 | A1* | 10/2022 | Drozd | ................... H04W 12/67 |
| 2022/0393952 | A1* | 12/2022 | Mortsolf | ............... H04L 43/045 |
| 2023/0209374 | A1* | 6/2023 | Saluja | ..................... H04L 41/22 |
| | | | | 370/216 |

OTHER PUBLICATIONS

3GPP TS 23.501, "Technical Specification Group Services and System Aspects; System architecture for the 5G System (5GS)", 3rd Generation Partnership Project 2021, vol. 2, No. 17, 3GPP Organizational Partners, Mar. 2021, 489 pp.

(Continued)

*Primary Examiner* — Mong-Shune Chung
(74) *Attorney, Agent, or Firm* — Shumaker & Sieffert, P.A.

(57) ABSTRACT

Techniques are disclosed for a user interface for displaying a topology representation of infrastructure of a 5G Radio Access Network (RAN), such as an Open Radio Access Network (O-RAN) 5G infrastructure. For example, a computing system displays, via a user interface, first icons, each icon of the first icons representing first components providing Level-1 functionality for the O-RAN 5G infrastructure, such as non-real-time RAN Intelligent Controllers (RICs). The computing system receives, via the user interface, a selection of a first icon of the first icons. In response to the selection, the computing system displays, via the user interface, second icons, each icon of the second icons representing second components managed by a component of the first components corresponding to the selected first icon. The second components provide Level-2 functionality for the O-RAN 5G infrastructure, such as near-real-time RICs.

20 Claims, 33 Drawing Sheets

(56) References Cited

OTHER PUBLICATIONS

Juniper, "What is a RAN Intelligent Controller (RIC)?", Juniper Networks, Inc., 6 pp., Retrieved from the Internet on Dec. 8, 2022 from URL: https://www.juniper.net/us/en/research-topics/what-is-ric.html.

Juniper, "What is Open RAN?", Juniper Networks, Inc., 5 pp., Retrieved from the Internet on Dec. 8, 2022 from URL: https://www.juniper.net/us/en/research-topics/what-is-open-ran.html.

O-RAN Alliance, "O-RAN Architecture Description 7.0", Oct. 21, 2022, 38 pp., URL: https://orandownloadsweb.azurewebsites.net/specifications.

O-RAN Alliance, "O-RAN Architecture Description 8.0", Nov. 17, 2022, 40 pp., URL: https://brandownloadsweb.azurewebsites.net/specifications.

O-RAN Alliance, "O-RAN Information Model and Data Models 1.0", Jul. 1, 2022, 32 pp., URL: https://brandownloadsweb.azurewebsites.net/specifications.

O-RAN Alliance, "O-RAN Near-RT RIC Architecture 3.0", Nov. 8, 2021, 104 pp., URL: https://brandownloadsweb.azurewebsites.net/specifications.

O-RAN Alliance, "O-RAN Near-RT RIC Architecture 4.0", Nov. 20, 2022, 115 pp., URL: https://brandownloadsweb.azurewebsites.net/specifications.

O-RAN Alliance, "O-RAN Non-RT RIC Architecture 2.01", Jul. 30, 2022, 39 pp., URL: https://orandownloadsweb.azurewebsites.net/specifications.

O-RAN Alliance, "Slicing Architecture Technical Specification 8.0", Aug. 1, 2022, 58 pp., URL: https://brandownloadsweb.azurewebsites.net/specifications.

O-RAN Alliance, "Slicing Architecture Technical Specification 9.0", Nov. 18, 2022, 64 pp., URL: https://brandownloadsweb.azurewebsites.net/specifications.

\* cited by examiner

Services / Templates ∨ / Communication Service ∨ / Service Order
Service Order ⓘ  ☆  Cancel  Back  Next  ⟋324

General  Area of Service  Subscribers  Summary

∨ General Information
∨ General Slice Template

Priority Level ⓘ  [10] [▲]
Max Latency / Packet Delay Budget  [60] ms
0  10 20 30 40 50 60 70 80 90 100

Max UEs  [60]
0  10 20 30 40 50 60 70 80 90 100

Max PDU Sessions  [5000]
0  1k 2k 3k 4k 5k 6k 7k 8k 9k 10k

∨ Throughput Configuration  ⟋336
Uplink per Slice  [500] to [800] Mbps
0  100 200 300 400 500 600 700 800 900 1k Downlink per Slice  [500] to [800] Mbps
0  100 200 300 400 500 600 700 800 900 1k Max Uplink per UE  [500] Mbps
0  100 200 300 400 500 600 700 800 900 1k Max Downlink per UE  [500] Mbps
0  100 200 300 400 500 600 700 800 900 1k

FIG. 3D

Services / Templates ∨ / Communication Service ∨ / Service Order
Service Order ⓘ

General ── Area of Service ── Subscribers ── Summary

ⓘ For now, Communication Service is enabled for all subscribers.

Subscribers

| IMSI Number | Description | Wildcard |
|---|---|---|
| ☐ 4600013579246800 | Description | RiC1: edge1 |
| ☑ 502130123456789 | Description | RiC2: edge2 |
| ☑ 4600013579246800 | Description | RiC1: edge1 |
| ☐ 3101708454660904 | Description | RiC2: edge2 |
| ☐ 502130123456789 | Description | RiC1: edge1 |
| ☐ 4600013579246800 | Description | RiC2: edge2 |
| ☐ 4600013579246800 | Description | RiC1: edge1 |
| ☐ 4600013579246800 | Description | RiC1: edge1 |

523 Items

FIG. 3F

Service order History

| Order ID | Description | CST Name | CSI Name | Deployment Status |
|---|---|---|---|---|
| 4600013579246801 | Description | xxx | Video Streaming | Acknowledged |
| 5021301234567891 | Description | xxx | Video Streaming | Failed |
| 4600013579246801 | Description | xxx | Video Streaming | In Progress |
| 3101708454660941 | Description | xxx | Video Streaming | In Progress1 |
| 5021301234567891 | Description | xxx | Video Streaming | In Progress1 |
| 4600013579246801 | Description | xxx | Video Streaming | Completed |
| 4600013579246801 | Description | xxx | Video Streaming | Failed |
| 4600013579246801 | Description | xxx | Video Streaming | In Progress1 |
| 4600013579246801 | Description | xxx | Video Streaming | In Progress |

9 Items

The service order (4600013579246801) is placed successfully.

FIG. 4

USER INTERFACE FOR 5G RADIO ACCESS NETWORK (RAN) TOPOLOGY

TECHNICAL FIELD

This disclosure generally relates to computer networking, and more specifically to organizing network resources.

BACKGROUND

Computer networks have become ubiquitous, and the number of network applications, network-connected devices, and types of network-connected devices are rapidly expanding. Such devices now include computers, smart phones, Internet-of-Things (IoT) devices, vehicles, medical devices factory equipment, etc. 5G network architectures enhanced the ability to provide communication services using network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

Techniques are disclosed for a user interface for displaying a topology representation of infrastructure of a 5G RAN, such as an Open Radio Access Network (O-RAN) 5G infrastructure. A user interface as described herein may display icons representing various components of the O-RAN 5G infrastructure across various levels of functionality. Furthermore, the user interface as described herein may arrange the icons representing various components of the O-RAN 5G infrastructure in a hierarchical fashion so as to inform a user, such as an administrator, of the arrangement of the topology of the O-RAN 5G infrastructure. Furthermore, the user interface as described herein may provide expanding, collapsing, searching, and filtering functions so as to enhance the useability of the user interface. In some examples, the user interface as described herein may additionally provide, responsive to user input, detailed information about each component of the O-RAN 5G infrastructure, such as configuration, performance, events, or alarms related to the component.

In some examples of the techniques disclosed herein, a computing system displays, via a user interface, first icons, each icon of the first icons representing first components providing Level-1 functionality for the O-RAN 5G infrastructure, such as non-real-time RAN Intelligent Controllers (RICs). The computing system receives, via the user interface, a selection of a first icon of the first icons. In response to the selection, the computing system displays, via the user interface, second icons, each icon of the second icons representing second components managed by a component of the first components corresponding to the selected first icon. The second components provide Level-2 functionality for the O-RAN 5G infrastructure, such as near-real-time RICs.

The computing system may further receive, via the user interface, a selection of a second icon of the second icons. In response, the computing system displays, via the user interface, third icons, each icon of the third icons representing third components managed by a component of the second components corresponding to the selected second icon. The third components provide Level-3 functionality for the O-RAN 5G infrastructure, such as such as gNodeB (gNB), gNodeB Control Unit-Control Plane (gNB CU-CP), gNB-DU, en-gNB, en-gNB-CU, en-gNB-CU-CP, en-gNB-CU-UP, en-gNB-DU, ng-eNB, ng-eNB-CU, ng-eNB-DU, eNB, or gNodeB Control Unit-User Plane (gNB CU-UP) nodes. The computing system may further receive, via the user interface, a selection of a third icon of the third icons. In response, the computing system displays, via the user interface, fourth icons, each icon of the fourth icons representing fourth components managed by a component of the third components corresponding to the selected third icon. The fourth components provide Level-4 functionality for the O-RAN 5G infrastructure, such as disaggregated views of third Level-3 functionality that include gNB-CU-CP, gNB-CU-UP, gNB-DU, en-gNB-CU-CP, en-gNB-CU-UP, en-gNB-DU, ng-eNB-CU, ng-eNB-DU nodes.

In one example, a computing system includes processing circuitry having access to a memory, the processing circuitry configured to display, via a user interface, a plurality of first icons, each icon of the plurality of first icons representing a plurality of first components providing Level-1 functionality for an Open Radio Access Network (O-RAN) 5G infrastructure. The processing circuitry is further configured to receive, via the user interface, a selection of a first icon of the plurality of first icons, and responsive to the selection of the first icon, display, via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

In another example, a method includes displaying, by processing circuitry and via a user interface, a first plurality of icons, each icon of the first plurality of icons representing a plurality of first components providing Level-1 functionality for an Open Radio Access Network (O-RAN 5G infrastructure. The method further includes receiving, by the processing circuitry and via the user interface, a selection of a first icon of the plurality of icons, and responsive to the selection of the first icon, displaying, by the processing circuitry and via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

In another example, a non-transitory computer readable medium comprising instructions that, when executed, cause one or more programmable processors to display, via a user interface, a plurality of first icons, each icons of the plurality of first icons representing a plurality of first components providing Level-1 infrastructure for an Open Radio Access Network (O-RAN) 5G infrastructure. The non-transitory computer readable medium further comprising instructions that, when executed, cause one or more programmable processors to receive, via the user interface, a selection of a first icon of the plurality of first icons and responsive to the selection of the first icon, display, via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

The techniques of the disclosure may provide specific improvements to the computer-related field of computer networking and 5G communications that have practical applications. For example, the techniques set forth in the disclosure may provide a configurable network management system that enables an operator to visualize and configure various components within the infrastructure of a RAN, such as a 5G O-RAN, in a scalable manner. For example, the techniques of the disclosure enable a user interface that may provide tools for expanding, collapsing, searching, and filtering components represented by the user interface so as to enhance the useability and understandability of the various infrastructure forming the RAN, even where such components number in the thousands or tens of thousands. A user interface as described herein may therefore enable a user to view, in a single pane of glass, all of the various components and infrastructure forming a RAN, as well as configuration, status, and alerts for such components and infrastructure, in a scalable and easily apprehensible manner. Furthermore, a user interface as described herein may enable an administrator to deploy, configure, onboard, and remove components within the RAN in a simplified manner. Therefore, a user interface in accordance with the techniques of the disclosure may improve the operability of a RAN by simplifying visualization, deployment, management, and troubleshooting of a RAN as compared to conventional methods, as well as facilitating scalability and ease of administration of such a RAN.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3G are conceptual views of user interfaces for provisioning a network service, according to techniques of the disclosure.

FIG. 4 is a conceptual view of a user interface showing service order status, according to techniques of the disclosure.

DETAILED DESCRIPTION

Figure 1:
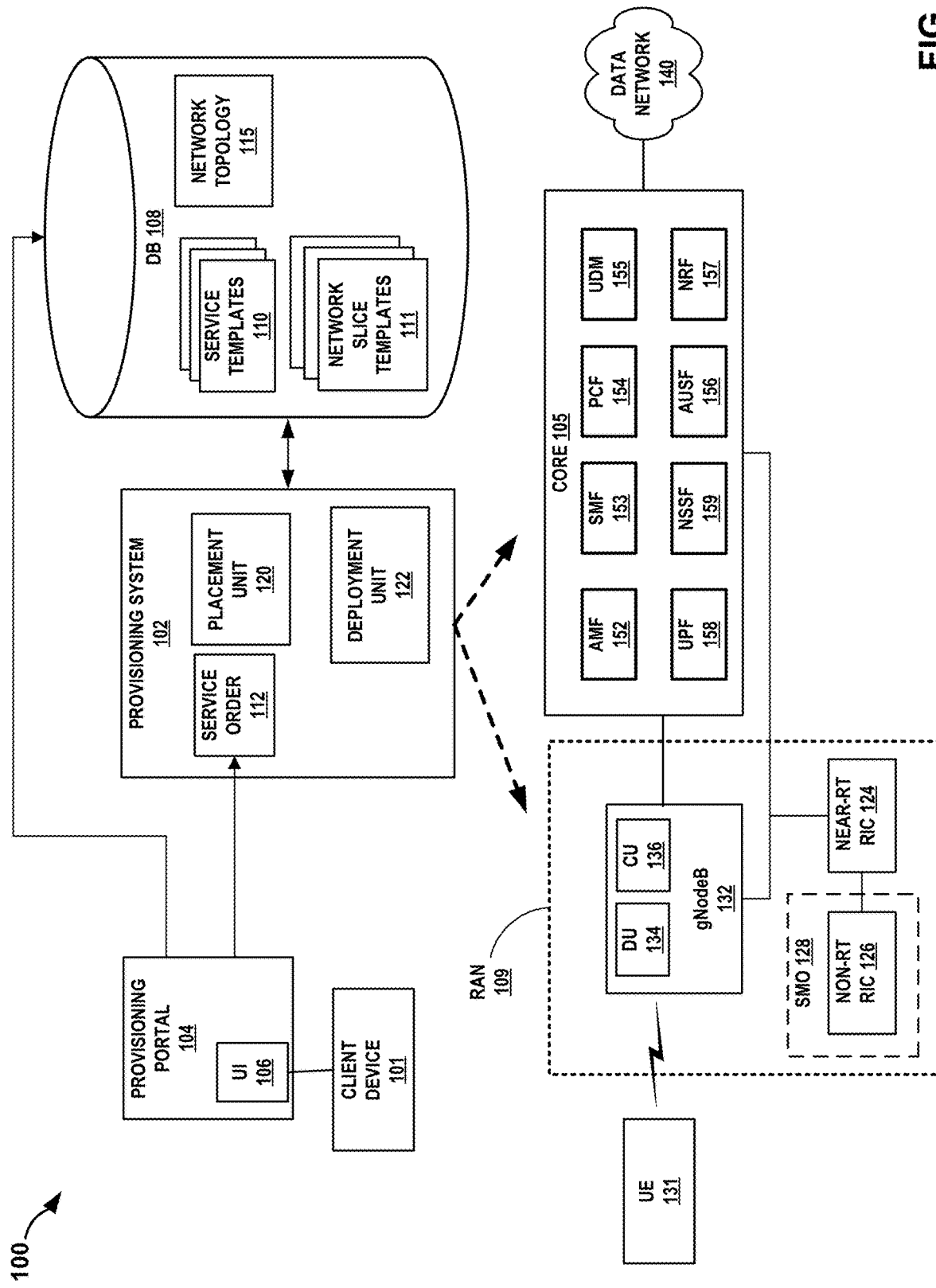
FIG. 1 is a block diagram illustrating an example network system, according to techniques of the disclosure.

Typically, Open RAN refers to a disaggregated RAN with open interfaces between network components sourced from multiple suppliers. The use of O-RAN is an ongoing shift in mobile network architecture that enables service providers the use of non-proprietary subcomponents from a variety of vendors. In an O-RAN, specific proprietary components like remote radio head (RRH) and baseband units (BBUs) are disaggregated to centralized units (CU), distributed units (DU), and radio units (RU). With O-RAN, the disaggregated functions may be virtualized or containerized. Additionally, in an O-RAN, the interfaces between these components are open and interoperable. Furthermore, the O-RAN involves the use of a RIC, which adds intelligence to the networks.

Additional information regarding the implementation of O-RAN may be found in O-RAN Architecture Description 7.0, O-RAN Alliance (October 2022), available at https://orandownloadsweb.azurewebsites.net/specifications; O-RAN Information Model and Data Models 1.0, O-RAN Alliance (February 2021), available at https://orandownloadsweb.azurewebsites.net/specifications; and O-RAN Slicing Architecture 8.0 (October 2022), available at https://orandownloadsweb.azurewebsites.net/specifications; the entire content of each of which is incorporated by reference.

The RIC is a software-defined component of the O-RAN architecture that is responsible for controlling and optimizing RAN functions. The RIC is an important part of O-RAN disaggregation, bringing multi-vendor interoperability, intelligence, agility, and programmability to radio access networks. The RIC enables the onboarding of third-party applications that automate and optimize RAN operations at scale while supporting innovative use cases that lower mobile operators' total cost of ownership (TCO) and enhance customers' quality of experience (QoE). The RIC helps mobile operators reduce both infrastructure and operational costs, improve network performance, and increase business agility. It also helps them build new revenue streams with personalized services, network slicing, and indoor location tracking capabilities. For example, service providers can use the RIC to onboard third-party rApps/xApps that enhance RAN functions at scale with AI/ML technologies while addressing innovative use cases. This can result in lower TCO and better QoE.

The RIC is divided into non-real-time and near-real-time components. The Non-RT RIC is an element of the operator's centralized Service Management and Orchestration (SMO) Framework. Using specialized applications called rApps, the Non-RT RIC enables greater than 1-second control of RAN elements and their resources. It also provides network data, performance metrics, subscriber data, and AI-based recommendations for network optimization and policy guidance to xApps running on the Near-RT RIC, which in turn provides policy feedback to the Non-RT RIC. The Near-RT RIC resides within a telco edge or regional cloud and typically enables network optimization actions that take between 10 milliseconds to one second to complete.

Additional information regarding the implementation of RICs may be found in O-RAN Non-RT RIC Architecture 2.01, O-RAN Alliance (October 2022), available at https://orandownloadsweb.azurewebsites.net/specifications; and O-RAN Near-RT RIC Architecture 3.0 (October 2022), available at https://orandownloadsweb.azurewebsites.net/specifications; the entire content of each of which is incorporated by reference.

Techniques are disclosed for a user interface for displaying a topology representation of infrastructure of a 5G RAN, such as an O-RAN 5G infrastructure. The user interface described herein provides, e.g., a topology representation of the O-RAN infrastructure, including views of an end-to-end workflow that includes single and multiple non-RT RICs, near-RT RICs, gNBs, gNB CU-Ups, ng-eNBs, gNB-Dus. The user interface described herein generates and provides parameters that define a RIC topology, generates visualizations of statistics, enables an administrator to offboard or remove nodes, enables an administrator to onboard and deploy new nodes, and enables a user to filter nodes from a representation of an infrastructure's inventory, among other functions. In some examples, the user interface described herein displays hierarchal organizations of an O-RAN topology, including the various components such as RICs. Furthermore, the user interface as described herein enables the visualization of the O-RAN topology with enhanced scalability, enables the filtering of nodes from the visualization, and provides detailed information, such as network statistics, to the administrator. The user interface additionally enables users to filter components by component functionality In some examples, the user interface described herein displays information regarding the severity of network events as well as network traffic details for nodes and links within the O-RAN topology.

The user interface described herein further displays xApps and E2 node information and statistics. In some examples, the user interface described herein provides an action bar for offboarding nodes and removing the nodes from the network inventory. In some examples, the user interface described herein enables the toggling of the topology view between a geographical view and a list view. In some examples, the user interface described herein uses CCS, SVG, and graph layout libraries to generate dynamic and configurable visuals within the user interface. In some examples, the user interface described herein enables a user to collapse and expand lists of multiple nodes to view individual nodes and lists of multiple nodes.

FIG. 1 is a block diagram illustrating example network system 100, according to the techniques of this disclosure. In the example illustrated in FIG. 1, network system 100 includes provisioning system 102, provisioning portal 104, one or more radio access networks (RANs) 109, SMO 128, non-RT RIC 126, near-RT RIC 124, and core 105. Provisioning system 102 provisions communication services for customer of a network operator, for example, a mobile network operator. As an example, a tenant may order a communication service from a mobile network operator. The desired service may be described in service order 112. Provisioning system 102 processes the service order and may assign communications infrastructure and resources needed to provide the desired service to the tenant based on information in service order 112.

In some aspects, resources associated with the service to the tenant may be provided by, or managed by, functions of core 105 and/or components of RAN 109. In some aspects, core 105 implements various discrete control plane and user plane functions for network system 100. In some aspects, core 105 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 may provide access mobility management services. SMF 153 may provide session management services. PCF 154 may provide policy control services. Unified Data Management (UDM) function 155 may manage network user data. AUSF 156 may provide authentication services. Network Repository Function (NRF) 157 may provide a repository that can be used to register and discover services in a network operator's network. Network Slice Selection Function (NSSF) 159 may be used to select an instance of an available network slice for use by a user equipment (UE) device 131. Core 105 may also include User Plane Functions (UPF) 158. UPF 158 may provide packet routing, forwarding and other network data processing functions (e.g., Quality of Service, packet inspection, traffic optimization etc.). Further details on services and functions provided by AMF 152, SMF 153, PCF 154, UDM 155, NRF 157, AUSF 156 NRF 157, UPF 158 and NSSF 159 can be found in $3^{rd}$ Generation Partnership Project 2021, *Technical Specification Group Services and System Aspects; System architecture for the 5G System* (5GS); *Stage* 2 (*Release* 17), TS 23.501 V17.0.0 (2021-03), the entire contents of which is hereby incorporated by reference.

In some examples, RANs 109 are one or more O-RANs. RANs 109 include radio units (Rus) located at various cellular network sites ("cell sites"), along with distributed units (Dus) and centralized units (Cus). Each RU consists of an LO PHY and a RF transmitter. The LO PHY component may be implemented using specialized hardware for high-performance packet processing.

Rus can connect to Dus via a fronthaul network. The fronthaul network connects LO PHY and HI PHY layers and is used by Rus and Dus to implement the F2 interface of 5G. Dus manage the packet transmission of radio by the Rus. In some cases, such packet transmission conforms to the Common Packet Radio Interface (CPRI) and/or to the enhanced CPRI (eCPRI) standard, or to IEEE 1914.3. Dus may implement the Radio Link Control (RLC), Media Access Control (MAC), and the HI PHY layer. Dus are at least partially controlled by Cus.

Dus can connect to Cus via a midhaul network, which may be used by Dus and Cus to implement the F1 interface of 5G. Cus may implement the Radio Resource Control (RRC) and Packet Data Convergence Protocol (PDCP) layers. Cus connect to core 105 via a backhaul network. The midhaul and backhaul networks may each be wide area networks (WANs).

RANs 109 may include a gNodeB 102. In some examples of radio access networks 109 of network system 100, gNodeB 102 includes a CU 136 and a DU 134. CU 136 may support multiple Dus to implement multiple gNodeBs. Further, one or more Rus may be supported by a single DU 134.

Any DU may or may not be located at the cell site that includes the RU(s) supported by the DU. A DU may be located at a cell site, while other Dus may be located at a local data center and collectively support multiple Rus. Network system 100 may have radio access networks 109 that include many thousands of cell sites and gNodeBs.

Radio access networks 109 connect to core 105 to exchange packets with data network 140. Core 105 may be a 5G core network, and data network (DN) 140 may represent, for example, one or more service provider networks and services, the Internet, $3^{rd}$ party services, one or more IP-VPNs, an IP-multimedia subsystem, a combination thereof, or other network or combination of networks.

Aspects of RAN 109 and/or core 105 may be managed and/or monitored by Service and Management Orchestrator (SMO) 128, non-RT RIC 126, and near-RT RIC 124. In some aspects, SMO 128, non-RT RIC 126, and near-RT RIC 124 may be operated by the mobile network operator providing 5G services to a tenant. SMO 128 can orchestrate and control management and automation aspects of RAN 109 (e.g., network slicing, management and orchestration of O-Cloud, etc.). Further, SMO 128 may control aspects of non-RT RIC 126 and near-RT RIC 124. Non-real time RIC 126 can provide non-real-time control and optimization of RAN elements and resources such as Rus, Dus 134, and Cus 136, workflow management, and policy-based control of applications and features of near-RT RIC 124. Near-real time RIC 124 can provide near-real-time control and optimization of RAN elements and resources via fine-grained data collection and actions over an E2 interface. Near-real-time RIC 124 can include enforcement of policies received from non-real-time RIC 126.

Non-RT RIC 126 and near-RT RIC 124 may deploy as a highly scalable, microservices based containerized architecture. Non-RT RIC 126 may onboard one or more applications, e.g., applications 123 (e.g., rApps) that manage non-real time events within non-RT RIC 126. Applications 123 represent applications that leverage the functionality exposed via the non-RT RIC framework of non-RT RIC 126. Near-RT RIC 124 may onboard one or more applications, e.g., applications 125 (e.g., xApps) that manage near-real time events within near-RT RIC 124. Applications 125 represent applications that leverage the functionality exposed via the near-RT RIC framework of near-RT RIC 124.

Provisioning portal 104 provides an interface for use by client device 101 to provision communication services. In some aspects, provisioning portal 104 can present a user interface 106 that presents user interface elements (e.g., screens, menus, maps, etc.) as part of managing a communication service. In some aspects, the user interface can include a plurality of icons representing a plurality of components of a 5G network.

Client device 101 can be an end-user computing device that receives user interface 106 elements for presentation, via a display coupled to client device 101, to a user operating client device 101. User interface 106 may be presented in a web browser executed by client device. In some aspects, client device 101 may be operated by a tenant of a mobile network operator and used to order a desired communication service. In some aspects, client device 101 may be operated by mobile network operator personnel and used to provision communication services for tenants or for the use of the mobile network operator. For example, a mobile network operator may use the provisioning portal to organize components of the 5G network.

Provisioning portal 104 can be communicatively coupled to client device 101 and provisioning system 102. In the example illustrated in FIG. 1, provisioning portal 104 is executed in a computing environment, which may be provided by a cloud service provider or at a branch office of the MNO. However, provisioning portal 104 may be executed in other environments. Provisioning portal 104 may be a component of provisioning system 102. Further, provisioning portal 104 may be a component of a server or other computing device in a data center, such as a data center of a mobile network operator. In addition, some operations attributed herein to provisioning system 102 or provisioning portal 104 may in various example be performed by either provisioning system 102 or provisioning portal 104.

In some aspects, communication services that may be organized using provisioning portal 104 include network slices. In 5G network environments, network slicing is a network architecture that facilitates creations of multiple virtualized and independent logical networks that are multiplexed over the same physical network infrastructure. A network slice can be logically isolated from other network slices and can be customized to meet service level expectations of an application that may be established by a service level agreement (SLA). In the example illustrated in FIG. 1, provisioning system 102 can create and allocate network slices on the mobile network operator's access network to data network 140. Further, provisioning system 102 may provide API calls for retrieving all available non-RT RICs. Provisioning system 102 may additionally provide API calls for retrieving a default topology that contains one non-RT RIC, the non-RT RICs connected near-RT RICs, and the respective E2 nodes. Provisioning system 102 may provide API calls for retrieving a selected topology that allows for user selection of components by non-RT RIC name, near-RT RIC name and ID, and E2 ID.

In some aspects, mobile network operator may create network slice templates 111. A network slice template 111 can be a blueprint that defines various network slice attributes used to configure a network slice. For example, a network slice template can define networks and services used by a slice and interfaces to such networks and services. The template may be used to create a slice that may be tailored for a particular purpose. For example, network slice templates 111 may include a template for creating a network slice to carry video streams, a template for creating a network slice to carry cloud gaming network traffic, a template for creating a network slice to carry artificial reality traffic, etc.

Techniques are disclosed for user interface 106 for displaying a topology representation of infrastructure of RAN 109, such as an Open Radio Access Network (O-RAN) 5G infrastructure. User interface 106, as described herein, may display icons representing various components of the infrastructure of RAN 109 across various levels of functionality. Furthermore, user interface 106 as described herein may arrange the icons representing various components of infrastructure of RAN 109 in a hierarchical fashion so as to inform a user, such as an administrator, of the arrangement of the topology of the infrastructure of RAN 109. Furthermore, user interface 106 as described herein may provide expanding, collapsing, searching, and filtering functions so as to enhance the useability of the user interface. In some examples, user interface 106 as described herein may additionally provide, responsive to user input, detailed information about each component of the O infrastructure of RAN 109, such as configuration, performance, events, or alarms related to the component.

In some examples of the techniques disclosed herein, provisioning portal 104 displays, via user interface 106, first icons. In some examples, each icon of the first icons represents first components providing, e.g., O-RAN Level-1 functionality for the infrastructure of RAN 109, such as non-RT RICs 126. Provisioning portal 104 receives, via user interface 109, a selection of a first icon of the first icons. In response to the selection, provisioning portal 104 displays, via user interface 106, second icons, each icon of the second icons representing second components managed by a component of the first components corresponding to the selected first icon. In some examples, the second components provide O-RAN Level-2 functionality for the infrastructure of RAN 109, such as near-RT RICs 124.

Provisioning portal 104 may further receive, via user interface 106, a selection of a second icon of the second icons. In response, provisioning portal 106 displays, via user interface 106, third icons, each icon of the third icons representing third components managed by a component of the second components corresponding to the selected second icon. In some examples, the third components provide O-RAN Level-3 functionality for infrastructure of RAN 109, such as such as gNodeB (gNB) 132, gNodeB Control Unit-Control Plane (gNB CU-CP), or gNodeB Control Unit-User Plane (gNB CU-UP) 136 nodes. Provisioning portal 104 may further receive, via user interface 106, a selection of a third icon of the third icons. In response, provisioning portal 104 displays, via user interface 106, fourth icons, each icon of the fourth icons representing fourth components managed by a component of the third components corresponding to the selected third icon. In some examples, the fourth components provide O-RAN Level-4 functionality for the infrastructure of RAN 109, such as such as Next Generation e-NodeB (ng-eNB) or gNodeB Distributed Unit (gNB-DU) 134 nodes. Provisioning portal 104 may display, via user interface 106, a default topology that has been selected at random by provisioning portal 104.

In accordance with the techniques of the disclosure, a user interface as described herein enables a user to request that the SMO/RIC backend provide API call(s) for retrieving all available non-RT RICs. A user interface as described herein additionally enables a user to request that the SMO/RIC backend provide API call(s) for retrieving a default topology that contains one non-RT RIC, its connected near-RT RICs, and respective E2 nodes. Additionally, a user interface as described herein enables a user to request that the SMO/RIC backend provide the API call(s) for the aforementioned components that are selected by non-RT RIC name, near-RT RIC name, near-RT RIC ID, and E2 node ID. A user interface as described herein additionally enables a topology to be selected at random. Additionally, a user interface as described herein enables a user to view a default selected topology (e.g., a non-RT RIC, its child near-RT RICs, and E2 nodes as expanded) and view other available non-RT RICs as non-expanded and as a group depending upon the number of non-RT RICs. A user interface as described herein additionally enables a user to visually understand the number of non-RT RICs deployed within a system when the non-RT RICs are grouped. Additionally, a user interface as described herein enables a user to view a single topology at a time (a single non-RT RIC, its child near-RT RICs and E2 nodes as expanded). Additionally, a user interface as described herein enables a user to select a desired topology by selecting the desired near-RT RIC contained within the topology, by selecting a desired non-RT RIC within the topology, or by selecting the desired E2 node within the topology. Further, a user interface as described herein enables a user to select a node by visually inspecting among non-RT RICs and selecting one of the non-RT RICs. Additionally, a user interface as described herein enables a user to filter nodes by non-RT RIC name, near-RT RIC name, near-RT RIC ID, and by E2 node ID.

Figure 2:
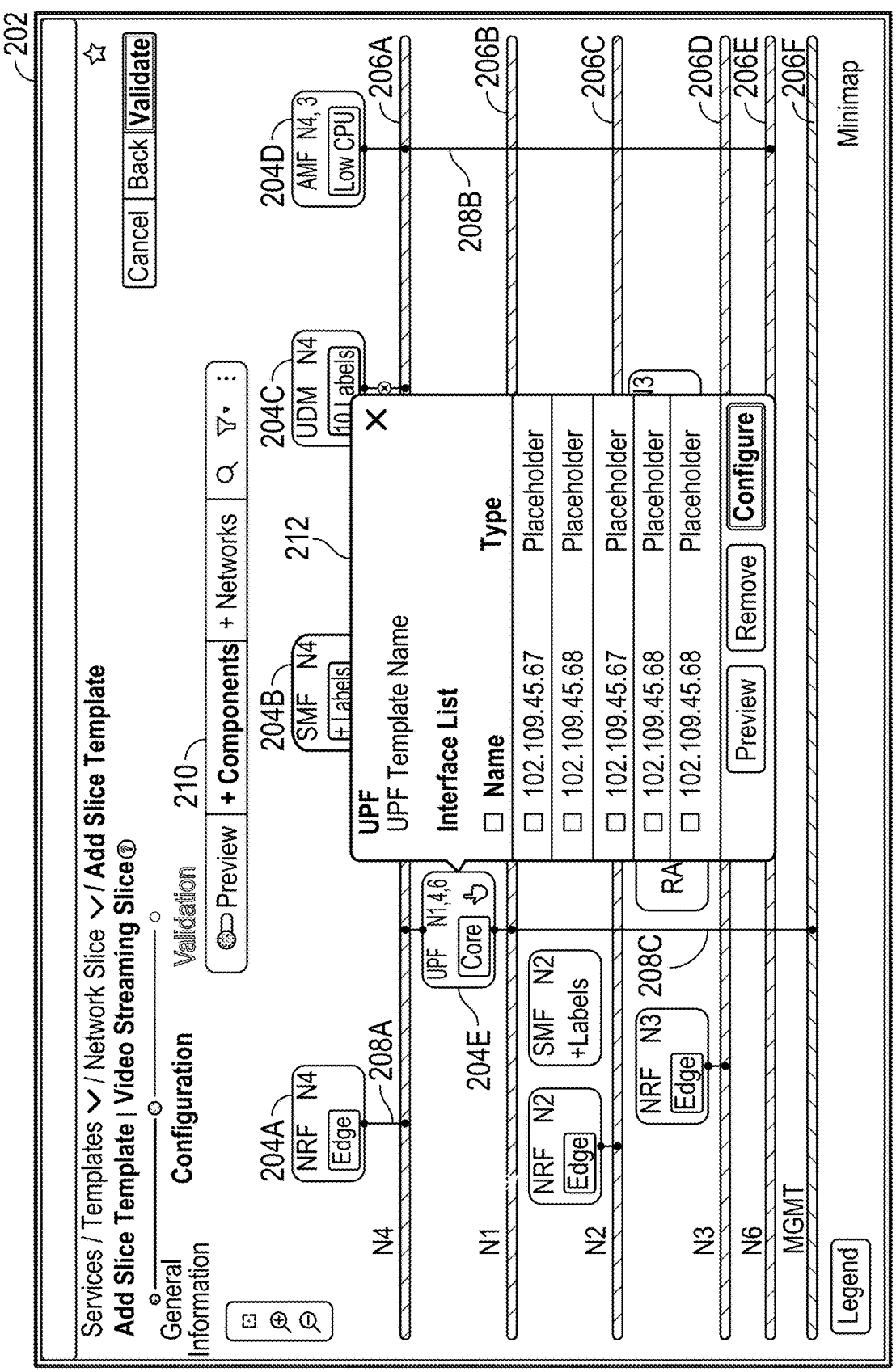
FIG. 2 is a conceptual view of a user interface for adding a network slice template, according to techniques of the disclosure.

FIG. 2 is a conceptual view of a user interface for adding a network slice template, according to techniques of the disclosure. FIG. 2 will be discussed in conjunction with aspects of FIG. 1. Slice template screen 202 may be used, for example, by a mobile network operator to define network slice templates for use by tenants in ordering and provisioning communication services. In some aspects, slice template screen 202 may be provided by user interface 106 of provisioning portal 104. In the example illustrated in FIG. 2, interface screen 202 includes graphical elements representing components used to implement a network slice, including network functions 204A-204E, interfaces 206A-206F, and connections 208A-208C. In some aspects, a function 204 may be any of functions 152-159 of core 105. Slice template screen 202 can provide a user interface to incorporate network functions 204A-204E and network interfaces 206A-206F into a network slice template. Slice template screen 202 can also be used to create and display connections 208 between interfaces 204 and functions 206. Provisioning portal 104 may obtain available functions, interfaces, and other network infrastructure elements to use when defining a network slice template from network topology 115 of database 108.

A user may utilize slice template screen 202 to add slice components such as functions 204 and interfaces 206 using control 210 to a network slice definition. After functions 204 and interfaces 206 are added to a network slice template, the user may utilize the interface provided in screen 202 to connect functions to interfaces. In the example illustrated in FIG. 2, NRF function 204A has been connected to N4 interface 206A, AMF function 204D has been connected to N4 interface 206A and N3 interface 206D, UPF interface 204E has been connected to N4 interface 206A, N1 interface 206B, and N6 interface 206E. Interface 206F can be a virtual network that connects multiple network functions. In the example shown in FIG. 2, management interface 206F can be a virtual network with management capabilities that connects multiple network functions. The network slice template, once created, can be used as a blueprint to create video streaming slices.

In some aspects, a function 204 may be assigned one or more labels using slice template screen 202. In the example, illustrated in FIG. 2, NRF function 204A has been assigned a label "Edge," AMF function 204D has been assigned a label "Low CPU," and UPF function 204E has been assigned the label "Core." Other functions 204 shown in FIG. 2 have also been assigned labels. During deployment of a slice created using the template, provisioning system 102 may use a label for a function 204 to match functions used by the provisioned slice to network infrastructure such as compute clouds or compute nodes. For example, a function having an "Edge" label may indicate that it is desirable (or even mandatory) that provisioning system 102 assign the function to resources in an edge compute cloud. For instance, it may be desirable that NRF function 204A be available with low latency, thus making it more desirable for provisioning system 102 to locate NRF function 204A at an edge of the network slice infrastructure. In this case, NRF function 204A has been assigned an "Edge" label. As a further example, a "Core" label may indicate that it is desirable that the network function be assigned to resources closer to the core of the 5G network slice. For example, User Plane Function (UPF) 204 carries data between a data network and user equipment and it may be desirable to locate UPF 204 closes to the data network (e.g., closer to the core). Other location-related labels may include "regional" or "national". A "low CPU" label may indicate that the function does not require high performance processing capability and can thus be assigned to resources that utilize lower performance processors. A "SmartNIC" label may indicate the function should be deployed to a compute node having a SmartNIC. Other labels may indicate the type of orchestration system for deployed the labeled function, such as "OpenShift", "OpenStack", or "Kubernetes". If a data center or cloud is not capable of supporting a capability associated with a label, the data center or cloud is not able to host the labeled function and may not be selectable in the portal user interface 106 by the user.

In some aspects, a user may utilize slice template screen 202 to obtain further information from components displayed on screen 202. In the example shown in FIG. 2, a user has selected UPF function 204E and, in response, provisioning portal 104 displays, on screen 202, information box 212 about UPF function 204E, including information related to the in interfaces of UPF function 204E. Information box 212 can include control elements (e.g., buttons, menus etc.) to configure the selected element (UPF function 204E in this example), remove the selected element, or preview the selected element. In some aspects, in response to selection of the preview control element, provisioning portal 104 displays the constituent network functions, configuration, and interfaces of the selected element. If the element currently has no constituent elements, the preview control element may be disabled.

After a user has defined a network slice template, for example, using screen 202, the user may assign a name to the network slice template and save the network slice template in database 108 as one of network slice templates 111 for later use in the on-demand provisioning of service facilitated by network system 100.

Returning to FIG. 1, database 108 may also include service templates 110. A mobile network operator may define (perhaps using user interface 106) service templates 110. Service templates 110 can include various templates that have predefined network service attributes that may be appropriate for various types of communication services. For example, service templates 110 may include templates that have predefined attributes that may be appropriate for network slices that are intended to carry enhanced mobile broadband (eMBB) network traffic, massive machine-type communications (mMTC) traffic, ultra-reliable and low-latency communications (URLLC) network traffic, video stream network traffic, augmented reality/virtual reality network traffic, cloud gaming network traffic, etc. Network service attributes can include labels identifying characteristics of components of a network service, core functions or other functions used to provide the communication service, interfaces used by the communication service, SLAs, throughput rates, latency characteristics, uplink and downlink limits, maximum number of UE devices allowed for the service, priority of the service, maximum sessions supported by the service, etc. A service template can serve as a blueprint for on-demand provisioning of communication services. For example, a tenant of a mobile network operator may select a service template as described below to perform on-demand ordering and provisioning of a communication service having attributes defined by the selected template.

FIGS. 3A-3G are conceptual views of user interfaces for provisioning a network service, according to techniques of the disclosure. The user interfaces of FIGS. 3A-3G will be discussed in conjunction with aspects of FIG. 1. Generally speaking, the user interfaces of FIGS. 3A-3G are part of a workflow that a tenant of a mobile network operator (or the mobile network operator itself) may perform to request on-demand provisioning of a communication service. The user interfaces illustrated in the examples of FIGS. 3A-3G may be provided to client device 101 by user interface 106 for presentation on a display of client device 101.

Figure 3A:
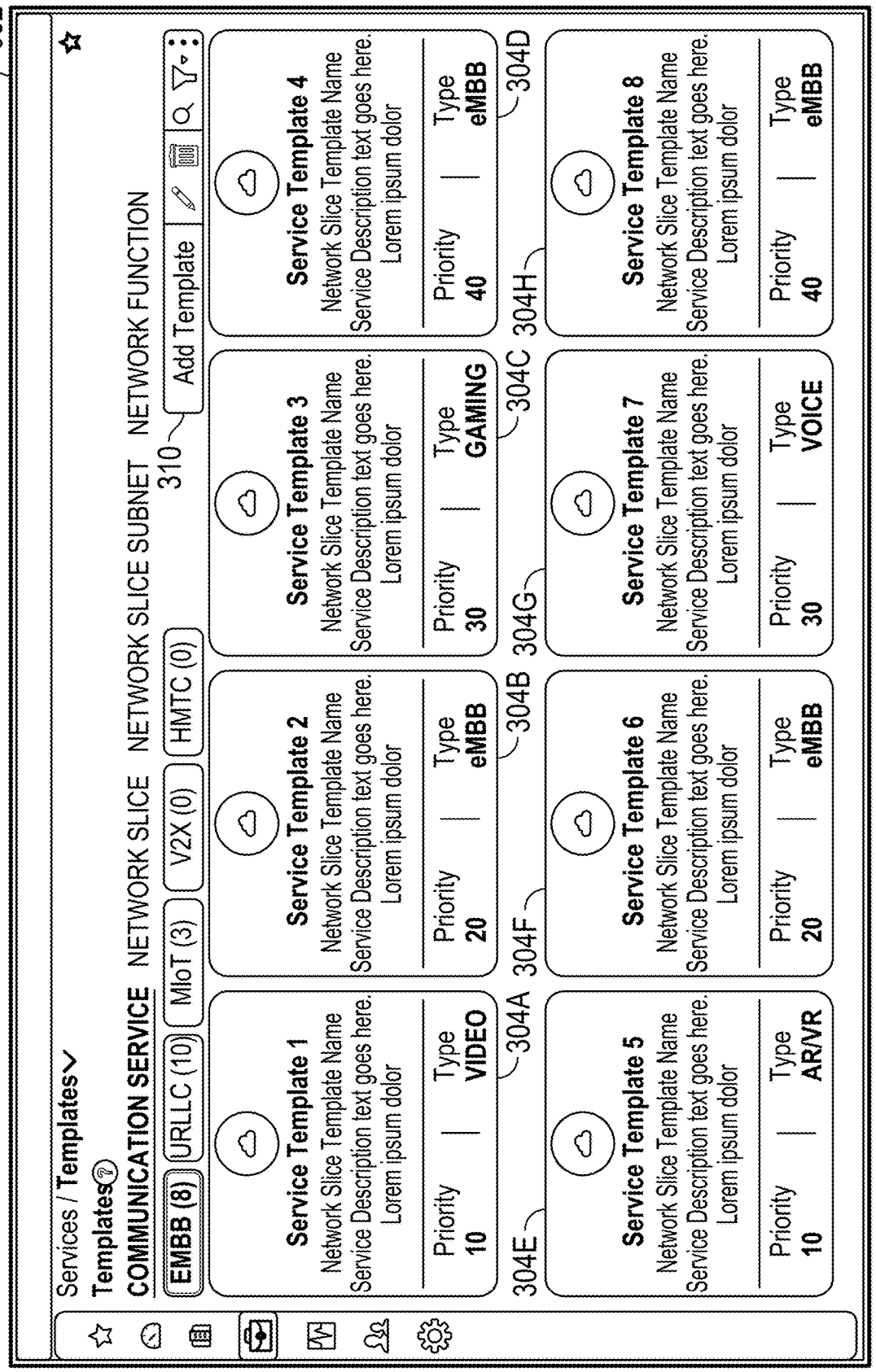

FIG. 3A is a conceptual view illustrating a service template selection screen 302, according to techniques of the disclosure. In some aspects, service template selection screen includes template icons 304A-304H (collectively "template icons 304") that each represent a different service template defined in service templates 110. In some aspects, a template icon can include the name of the template, a description of the template, a network slice template specified by the service template, a priority for network traffic for the provisioned service, and a type of service. A user desiring to provision a new communication service may utilize user interface 106 to select one of template icons 304 that most closely represents the type of communication service the user desires to provision.

Service template selection screen 302 include a control interface element 310 that include user interface elements that, when selected, cause the provisioning portal 104 to perform an action. For example, control interface element 310 includes an "add template" component that, when selected, causes provisioning portal 104 to present a user interface to configure a new service template. Other components of control interface element 310 can cause provisioning portal 104 to apply filters to service templates 304 and/or search for specific service templates 304.

Figure 3B:
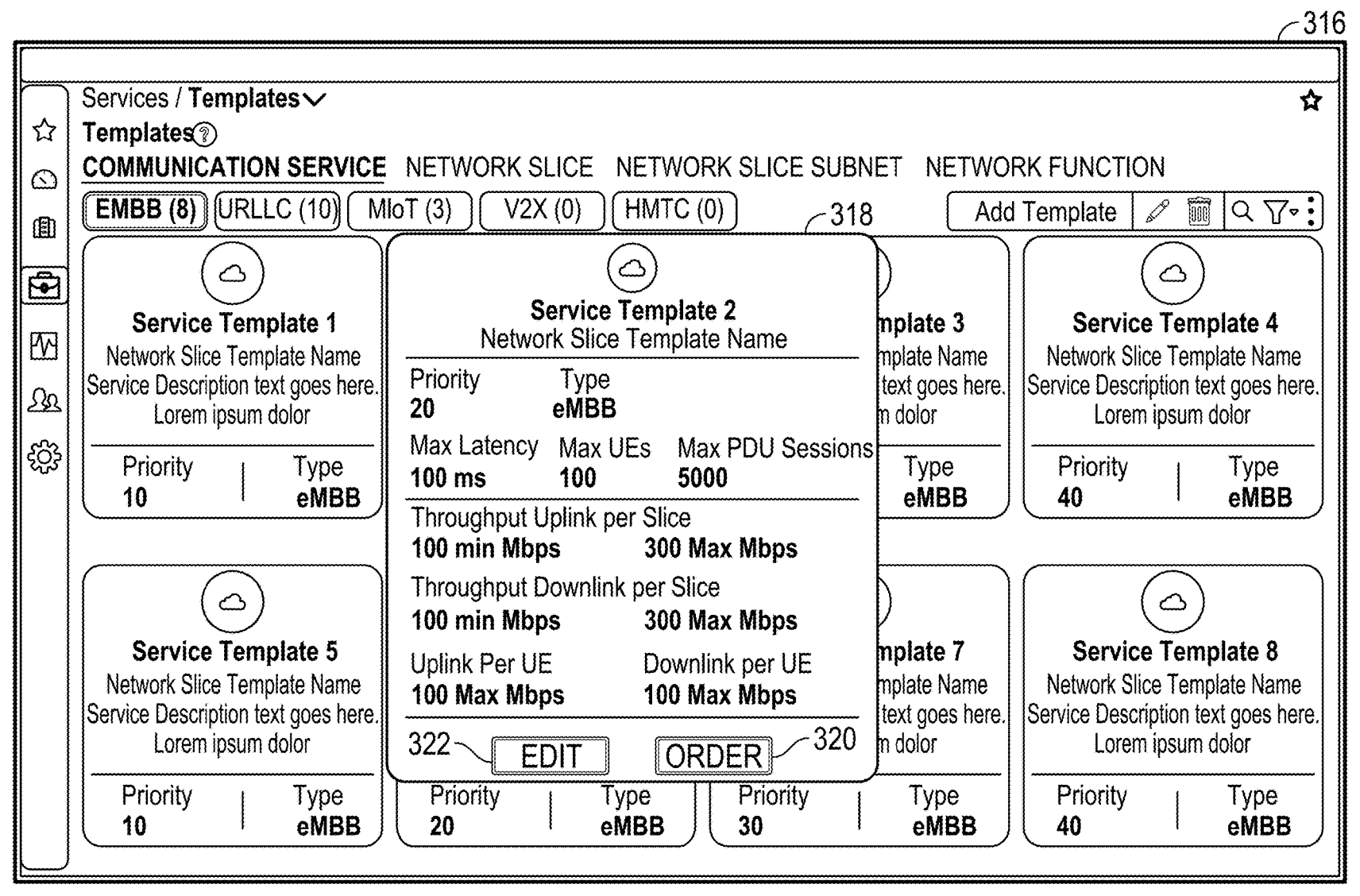

FIG. 3B is a conceptual view illustrating a service template definition screen 318, according to techniques of the disclosure. In the example illustrated in FIG. 3B, service template definition screen 318 is shown in response to selection of template icon 304B of FIG. 3A. Service template definition screen 318 displays attributes of the selected service template. Examples of such attributes include the priority of network traffic carried by a network slice created using the template (e.g., "20"), a type of network traffic carried by the network slice (e.g., "eMBB"). The attributes may also include service level attributes. For example, in the example illustrated in FIG. 3B, the template specifies a maximum latency (e.g., "100 ms), the maximum number of Ues for the communication service (e.g., "100"), and the maximum number of protocol data unit (PDU) sessions for the communication service (e.g., "5000"). Other SLA attributes that may specified include minimum and maximum uplink throughput for the network slice (e.g., "100 Mbps" and "300 Mbps" respectively), a minimum and maximum downlink throughput for the network slice (e.g., "100 Mbps" and "300 Mbps" respectively), and maximum uplink and downlink throughput per UE device (e.g., "100 Mbps" and "100 Mbps" respectively).

Service template definition screen may include an edit user interface element 322 and an order user interface element 320. In response to selection of edit user interface element 322, UI 106 of provisioning portal 104 can present an interface that can be utilized by a user to change various attributes from the default values provided by the selected service template. In response to selection of order user interface element 320, UI 106 of provisioning portal can present further user interfaces that to continue with a service order workflow. In some aspects, provisioning portal 104 may provide an estimated cost to the tenant for a service that is provisioned according to the selected template. For example, a communication service provisioned using a service template that specifies attribute values for a high throughput and/or low latency communication service may be priced higher than a communication service provisioned using a service template that does not specify attribute values for a high throughput and/or low latency communication service.

Figure 3C:
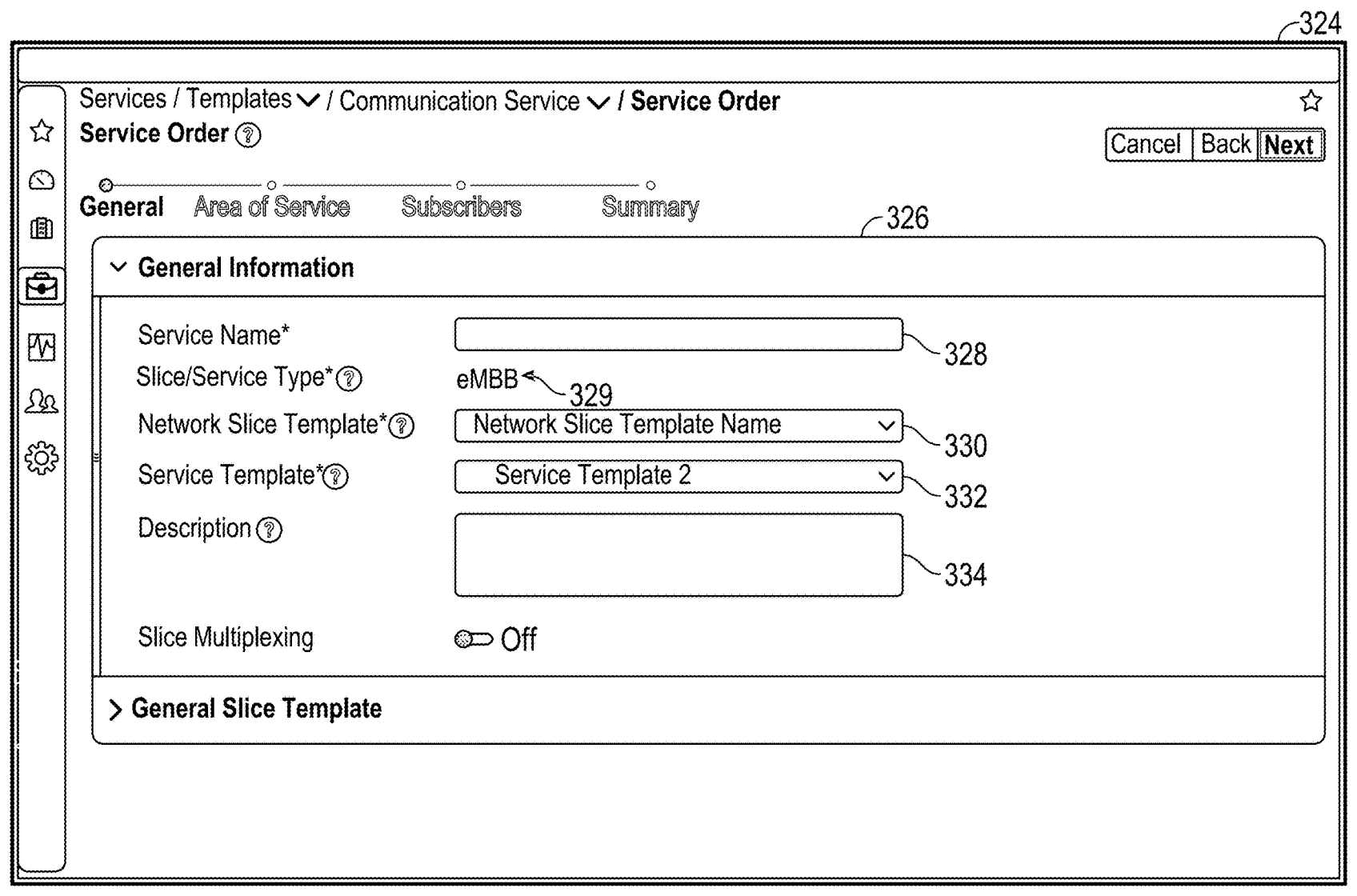

FIG. 3C is a conceptual view illustrating a general information portion 326 for a service order definition screen 324, according to techniques of the disclosure. UI 106 of provisioning portal 104 may present service order definition screen 324 to client device 101 in response to a user of client device 101 selecting the "order" user interface element 320 (FIG. 3B). General information portion 326 includes fields allowing a user to provide a communication service name 328 and a description 334 of the communication service to be provisioned. Additionally, general information portion 326 includes fields that can be used to modify attributes of the communication service from the defaults provided by the service template. For example, general information portion 326 may include service type field 329 that can be utilized to change the service type of the communication service to be provisioned from the default provided by the selected template. Similarly, network slice template field 330 can be used to change the network slice template from the default provided in the service template. Service template field 332 can be used to change the service template for the communication service to be provisioned to a different service template.

FIG. 3D is a conceptual view illustrating a general slice information portion 336 for a service order definition screen 324, according to techniques of the disclosure. General slice information portion 336 includes fields allowing a user to modify SLA related attributes for the network slice to be provisioned for the communication service. For example, general slice information portion 326 may include user interface elements allowing a user to modify SLA related attributes from the defaults provided by the network slice template associated with the service template. In the example illustrated in FIG. 3D, such attributes include priority, maximum latency, maximum Ues, maximum PDU sessions, minimum and maximum uplink throughput, minimum and maximum downlink throughput, maximum uplink throughput per UE, and maximum downlink throughput per UE.

Figure 3E:
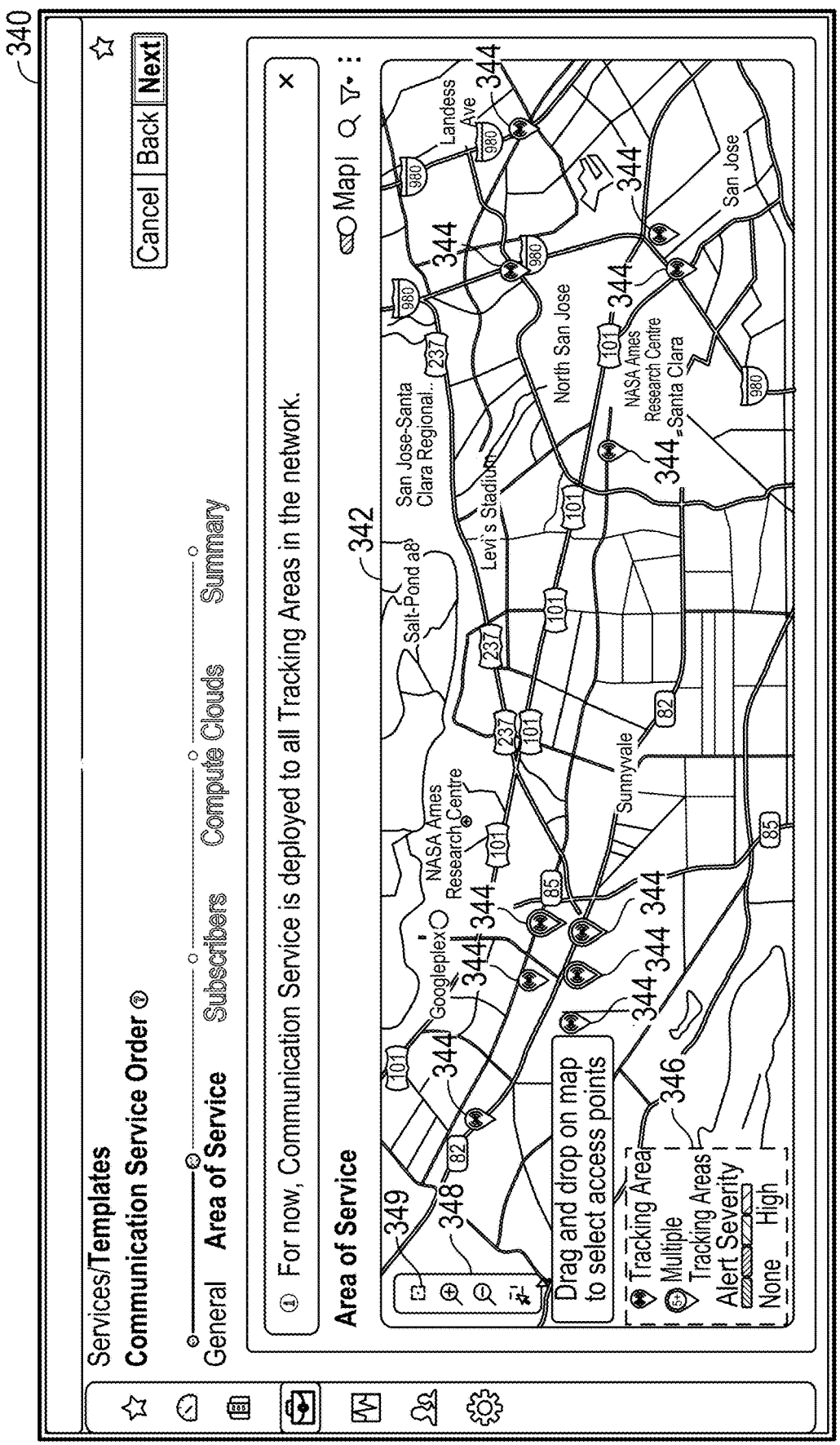

FIG. 3E is a conceptual view illustrating a tracking area selection screen 340 for a service order, according to techniques of the disclosure. Generally speaking, a tracking area is a set of one or more mobile network cells within region that are grouped together to facilitate reducing overhead involved with managing Ues. For example, handshaking protocols can be avoided when A UE moves from one cell in a tracking area to another cell in the same tracking area. A network slice can be associated with multiple tracking areas. Tracking area selection screen 340 of UI 106 provides selection mechanism for associated tracking areas with the network slice to be provisioned as part of a communication service. For example, a tenant may want to localize where a communication service is provided to their subscribers and can do so by selecting the desired tracking areas from selection screen 340. In the example illustrated in FIG. 3E, tracking area selection screen 340 shows a map 342 illustrating tracking areas 344 within a region. A user can utilize tracking area selection screen 340 to select one or more of tracking areas 344 to include in a network slice to be provisioned for the communication service.

Tracking area selection screen 340 includes a legend 346 that explains aspects of the tracking areas 344 shown on tracking area selection screen 340. As an example, legend 346 shows a color coded bar that can indicate an alert condition and severity associated with a tracking area. Tracking area selection screen 340 also includes control menu 348 having interface elements that can be used to select tracking areas 344 within a region, zoom in or zoom out on the map, etc. In some aspects, a user can utilize region selection tool 349 to select tracking areas of the mobile network operator that are within the region bounded by a rectangle formed using region selection tool 349. As an example, a tenant may desire to provide a specialized communication service in or near a stadium. The tenant can use region selection tool 349 to define the desired region around the stadium on map 342.

FIG. 3F is a conceptual view illustrating a subscriber screen 350 for a service order, according to techniques of the disclosure. Subscriber screen 350 of UI 106 can present a list 352 of subscribers associated with a tenant that is provisioning a communication service. The tenant can select the subscribers from the list that are to be given access to the communication service being provisioned by the tenant. In the example illustrated in FIG. 3F, a set of subscribers 354 has been selected to be granted access to the communication service once provisioned.

Figure 3G:
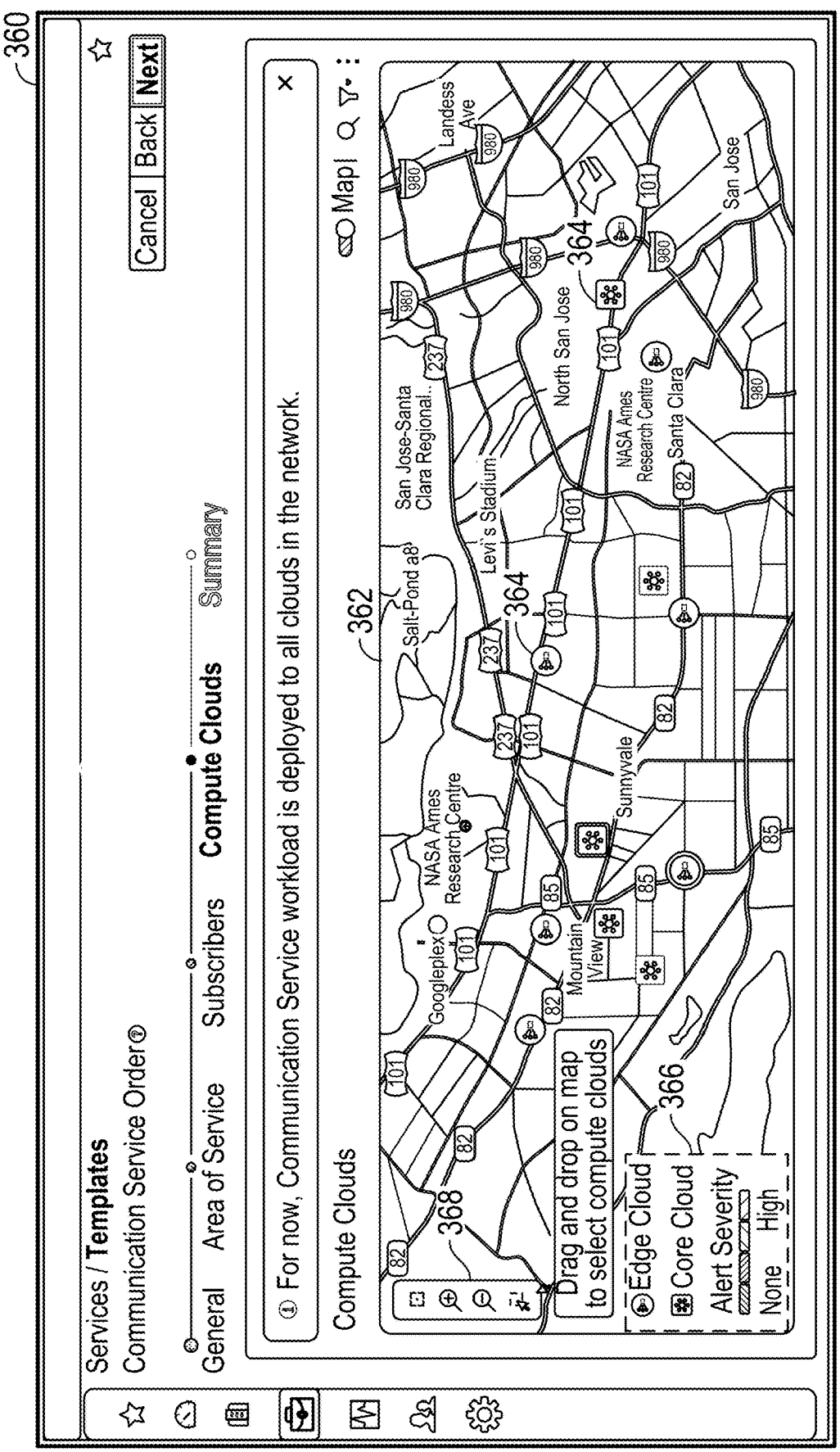

FIG. 3G is a conceptual view illustrating a compute cloud selection screen 360 for a service order, according to techniques of the disclosure. In the example illustrated in FIG. 3G, compute cloud selection screen 360 shows a map 362 illustrating icons 364 that represent compute clouds and/or data centers within a region. In some aspects, the compute clouds and/or data centers displayed on map 362 may be limited to compute clouds and/or data centers that are within the tracking areas previously selected via tracking area selection screen 340 of FIG. 3E. A user can utilize compute cloud selection screen 360 to select one or more of icons 364 representing the compute clouds and/or data centers that are to provide compute resources to execute workloads involved in providing the communication service to be provisioned. For example, workloads may include RAN functions, core 105 functions, etc. A user can select a compute cloud based on desired characteristics of the communication service. For example, the user may select an icon 364 representing an edge cloud if low latency to the end user is desired. Further, a user may select an icon representing a core cloud to cause centralized units (Cus) to positioned near a core cloud, and may select icons representing an edge cloud to cause distributed units (Dus) to be located at an edge cloud. In some aspects, a compute cloud may have a label that indicates characteristics of the compute cloud. For example, the compute cloud may have label indicating the compute cloud is an edge compute cloud, a core compute cloud. Further, labels may indicate the processing power of the compute cloud. Other label may indicate other characteristics of a compute cloud. A mobile network operator can assign such labels to compute clouds.

Compute cloud selection screen 360 can include a legend 366 that provides information about the elements on map 362. As an example, legend 346 shows a color coded bar that can indicate an alert condition and severity associated with compute clouds shown on map 362. Compute cloud selection screen 360 also includes control menu 368 that provides user interface elements that can be used to select icons 364 within a region, zoom in or zoom out on the map, etc.

Returning to FIG. 1, in some aspects, the screens shown in FIGS. 3A-3G can be used to complete a workflow that gathers information from a user regarding a communication service to be provisioned on-demand by the mobile network operator. The information can be used to create service order 112 that can be processed by provisioning system 102 to provision the desired communication service.

Placement unit 120 can provide the information in service order 112 as input to a placement algorithm (also referred to as a homing algorithm) executed by placement unit 120 that can determine placement communication service elements (e.g., Cus and Dus) within the tracking areas and compute clouds selected by the user as described above. In some aspects, placement unit 120 places communication service elements based on labels associated with network slice elements. As an example, the placement algorithm can match attributes of the communication service specified in the service order with labels associated with infrastructure elements in the network slice template and labels of compute clouds. For instance, placement unit 120 may attempt to place a DU for a communication service whose attributed indicates low latency is required in a DU that is at an edge cloud selected by the user. Placement unit 120 may use other characteristics and attributes to determine placement of the network resources used by the communication service. For example, placement unit 120 can use labels associated with each compute cloud that may define the scope of the service (e.g., edge, regional, national). Additionally, placement unit 120 may utilize labels that specify a container runtime (e.g., Kubernetes, Openstack, etc.) to constrain placement of workloads to resources that support the specified container runtime. Further, placement unit may utilize labels that indicate that a network resource includes a smart NIC when workloads in the communication service to be deployed have characteristics indicating that a smart NIC is required (or desirable). Moreover, placement unit 120 can take affinity constraints into account. For example, placement unit may attempt to place a CU in the same cloud (or cloud provider) as a DU.

In some aspects, compute cloud selection screen 360 of FIG. 3G may be an optional part of a workflow. In such aspects, the placement algorithm of placement unit 120 can automatically include compute clouds and data centers that are within the tracking areas selected via tracking area selection screen 340 of FIG. 3E. In some aspects, a user can optionally use compute cloud selection screen 360 to provide a finer grained selection of compute clouds and/or data centers.

In some aspects, placement unit 120 can generate an estimate of costs to the user associated with the communication service to be provisioned. The estimate can be provided the user, and the user can utilize the estimate to determine whether or not to have the communication service deployed by deployment unit 122.

In some aspects, placement unit 120 can determine if there is a feasible placement for the communication service elements that are needed to provision the communication service. If there is such a feasible placement, the placement details can be provided as input to deployment unit 122, which can perform the provisioning of the communication service based on service order 112 and the placement determined by placement unit 120. If there is not a feasible placement for the communication service using the parameter and information gathered by the workflow represented by FIGS. 3A-3G, provisioning portal 104 can inform the user that the communication service cannot be deployed as specified. The user can then return to the screens of FIGS. 3A-3G to modify the parameters so that the feasibility of the communication service with respect to placement of network resources can be redetermined by placement unit 120.

In the example workflow screens shown in FIG. 3E and FIG. 3G, a map view of tracking areas and compute clouds is provided to the user. Additionally, or as an alternative, a list view of tracking areas and compute clouds may be provided.

FIG. 4 is a conceptual view of a user interface showing a service order history, according to techniques of the disclosure. In the example illustrated in FIG. 4, service order history screen 402 includes a list 404 of service orders that have been received for processing by deployment unit 122 (FIG. 1). The history of service orders can indicate that the service order has been received but not yet processed, is currently being processed, has completed processing, or failed to be processed.

Figure 5:
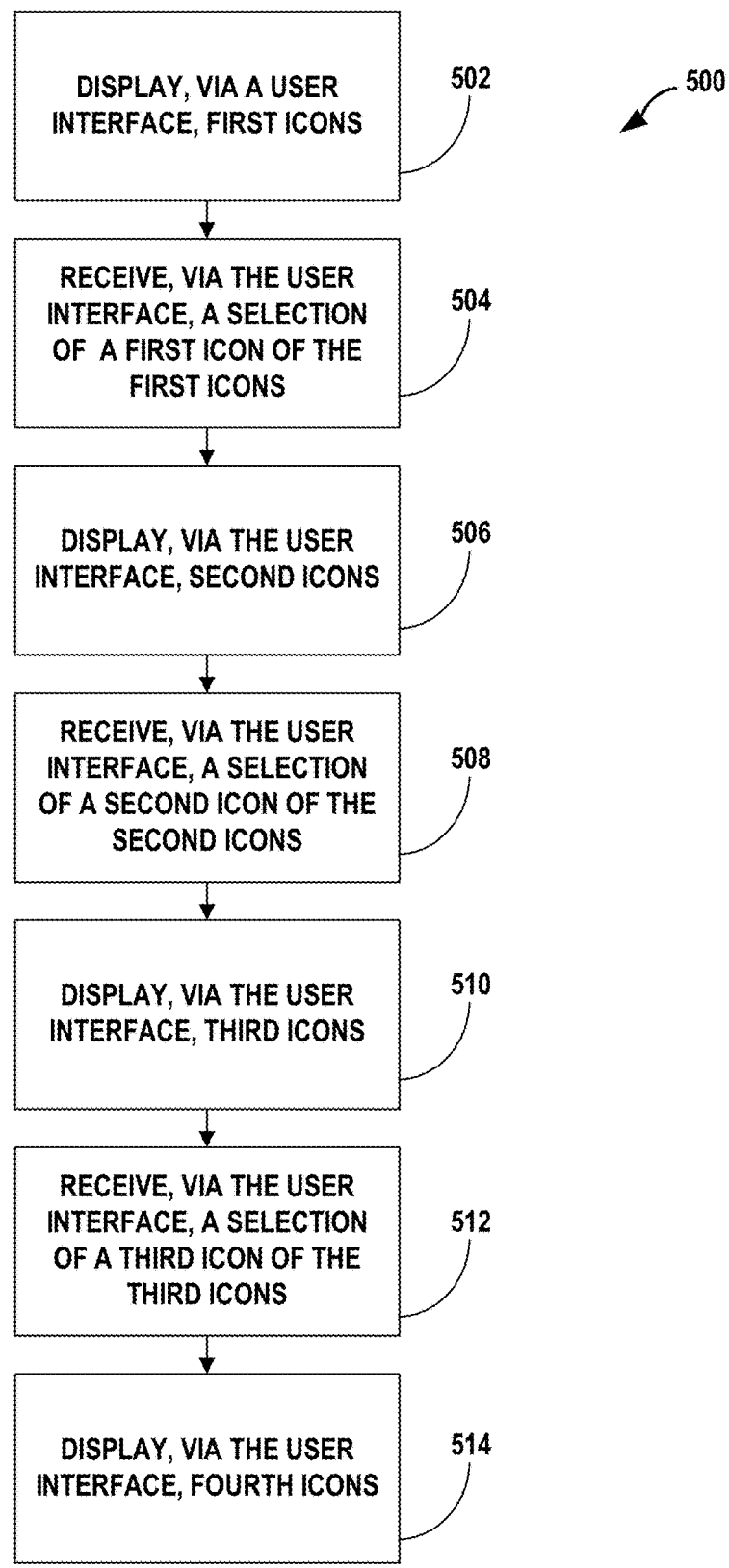
FIG. 5 is a flowchart illustrating an example operation in accordance with the techniques of this disclosure.

FIG. 5 is a flowchart illustrating an example operation in accordance with the techniques of this disclosure. For convenience, FIG. 5 is described with respect to FIG. 1. Specifically, FIG. 5 illustrates an operation of user interface 106 of FIG. 1 for displaying a topology of infrastructure of RAN 109, which may be a 5G O-RAN, in accordance with the techniques of this disclosure.

As depicted in the example of FIG. 5, provisioning portal 104 displays, via user interface 106, first icons (502). In some examples, each icon of the first icons represents first components providing, e.g., O-RAN Level-1 functionality for the infrastructure of RAN 109, such as non-RT RICs 126. Provisioning portal 104 receives, via user interface 106, a selection of a first icon of the first icons (504). In response to the selection, provisioning portal 104 displays, via user interface 106, second icons, each icon of the second icons representing second components managed by a component of the first components corresponding to the selected first icon (506). In some examples, the second components provide O-RAN Level-2 functionality for the infrastructure of RAN 109, such as near-RT RICs 124.

Provisioning portal 104 receives, via user interface 106, a selection of the second icon of the plurality of second icons (508). In response to the selection, provisioning portal 104 displays, via user interface 106, third icons, each icon of the third icons representing third components managed by a component of the selected second icon (510). In some examples, the third components provide O-RAN Level-3 functionality for the infrastructure of RAN 109, such as gNodeB (gNB), gNodeB Control Unit-Control Plane (gNB CU-CP), and/or gNodeB Control Unit-User Plane (gNB CU-UP) nodes.

Provisioning portal 104 receives, via user interface 106, a selection of the third icons of the plurality of third icons (512). In response to the selection, provision portal 104 displays, via user interface 106, fourth icons, each icons of the fourth icons representing fourth components managed by a component of the selection third icon (514). In some examples, the fourth components provide O-RAN Level-4 functionality for the infrastructure of RAN 109 such as Next Generation e-NodeB (ng-eNB) or gNodeB Distributed Unit (gNB-DU) nodes.

Figure 6:
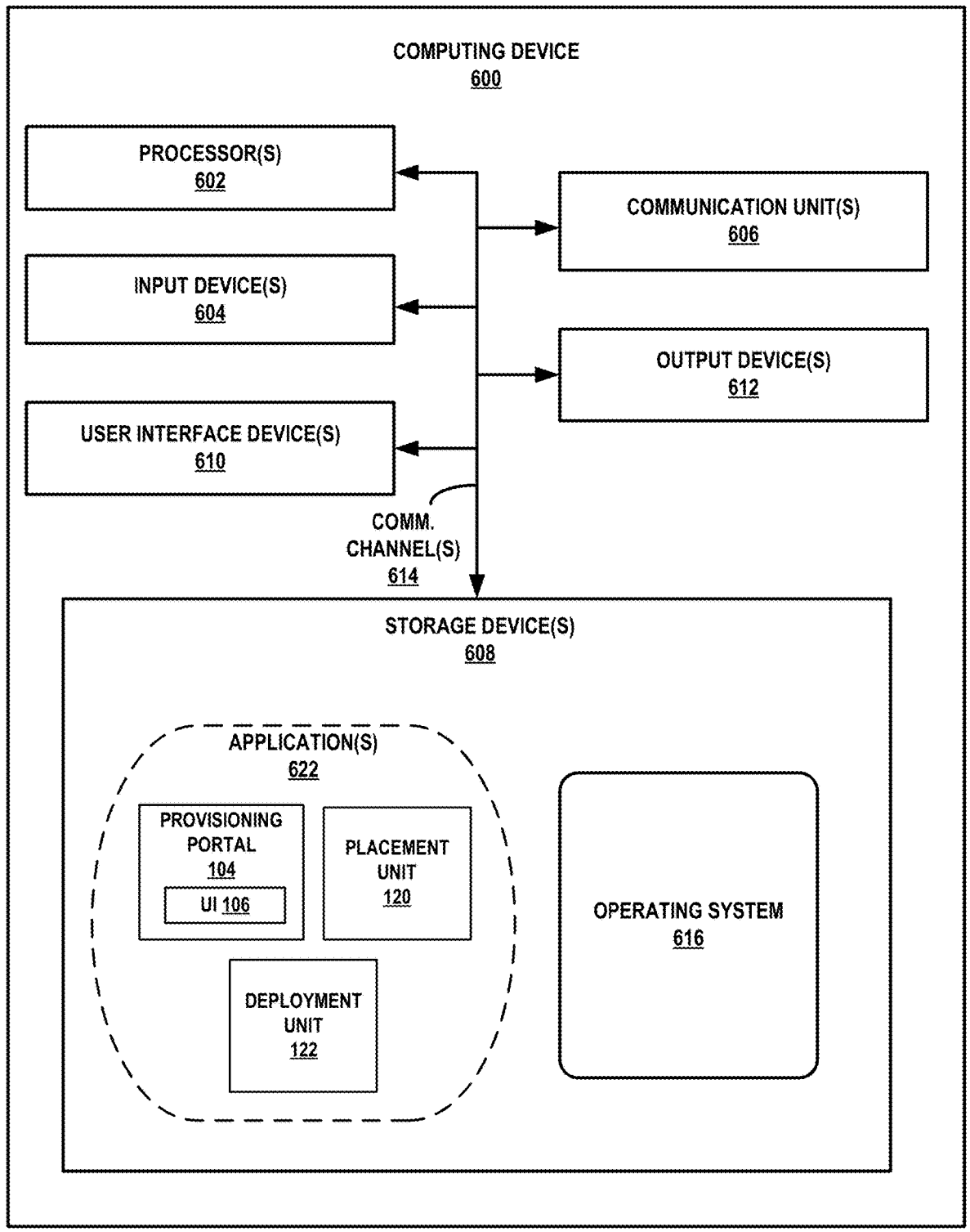
FIG. 6 is a block diagram illustrating an example computing device that operates in accordance with one or more techniques of the present disclosure.

FIG. 6 is a block diagram illustrating example computing device 600 that operates in accordance with one or more techniques of the present disclosure. As depicted in FIG. 6, computing device 600 is a server or other computing device and includes one or more processor(s) 602 for executing one or more applications 622, including provisioning portal 104, placement unit 120, deployment unit 122 or any other system, application, node software, or module described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components). In some examples, the functionality of computing device 600 is distributed across multiple computing devices or systems, such as may be provided by a "cloud" computing system.

As shown in the specific example of FIG. 6, computing device 600 includes one or more processors 602, one or more input devices 604, one or more communication units 606, one or more output devices 612, one or more storage devices 608, and user interface (UI) device 610. Computing device 600, in one example, further includes one or more applications 622 and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, a message bus, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be processing circuitry capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone, or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622, access network intelligent controller 102 and/or access network agents 624 with processors 602, communication unit 606, storage device 608, input device 604, user interface devices 610, and output device 612.

Application 622 may also include program instructions and/or data that are executable by computing device 600. Example applications 622 executable by computing device 600 may include application and/or other software to implement capabilities described above. For example, applications 622 can include applications associated with provisioning portal 104, placement unit 120, and deployment unit 122.

In accordance with the techniques of the disclosure, applications 622 include provisioning portal 104. Provisioning portal 104 provides, via output devices 612, a user interface such as user interface 106 of FIG. 1, which displays a representation of the infrastructure of RAN 109 of FIG. 1. As an example wherein RAN 109 of FIG. 1 is an O-RAN providing 5G connectivity, provisioning portal 104 may display, via output devices 612, a plurality of first icons, each of the first icons representing one or more first components providing Level-1 functionality for the O-RAN 5G infrastructure. In some examples, the first components are non-real-time RICs. In some examples, a single first icon may represent one or multiple components providing Level-1 functionality for the O-RAN 5G infrastructure.

In some examples, provisioning portal 104 is configured to receive, via user interface devices 610, a selection of a first icon of the plurality of first icons. Responsive to the selection of the first icon, provisioning portal 104 displays, via output devices 612, a plurality of second icons, wherein each of the second icons represents one or more second components providing Level-2 functionality for the O-RAN 5G infrastructure. In some examples, the second components are near-real-time RICs managed by the non-real-time RIC corresponding to the selected first icon. In some examples, a single second icon may represent one or multiple components providing Level-2 functionality for the O-RAN 5G infrastructure.

Provisioning portal 104 further is configured to receive, via user interface device(s) 610, a selection of a second icon of the plurality of second icons. Responsive to the selection of the second icon, provisioning portal 104 displays, via output device(s) 612, a plurality of third icons, wherein each of the third icons represents one or more third components providing Level-3 functionality for the O-RAN 5G infrastructure. In some examples, the third components are one or more gNB, gNB CU-CP, or gNB CU-UP nodes managed by the near-real-time RIC corresponding to the selected second icon. In some examples, a single third icon may represent one or multiple components providing Level-3 functionality for the O-RAN 5G infrastructure.

Provisioning portal 104 further is configured to receive, via user interface device(s) 610, a selection of a third icon of the plurality of third icons. Responsive to the selection of the third icon, provisioning portal 104 displays, via output device(s) 612, a plurality of fourth icons, wherein each of the fourth icons represents one or more fourth components providing Level-4 functionality for the O-RAN 5G infrastructure. In some examples, the fourth components are one or more ng-eNB or gNB-DU nodes managed by the gNB, gNB CU-CP, or gNB CU-UP node(s) corresponding to the selected third icon. In some examples, a single fourth icon may represent one or multiple components providing Level-4 functionality for the O-RAN 5G infrastructure.

In some examples, provisioning portal 104 displays, via output device(s) 612, an alert associated with one of the components of infrastructure of RAN 109. For example, in response to receiving, by provisioning portal 104 via user interface device(s) 610, a selection of one of the first, second, third, or fourth icons, provisioning portal 104 displays, via output device(s) 612, one or more alerts, messages, alarms, etc. associated with the component represented by the selected icon. In some examples, provisioning portal 104 may display the alert, message, or alarm responsive to a user clicking on an icon or in the alternative, in response to the user "hovering" a cursor over the icon for a predetermined amount of time.

In addition, responsive to receiving a selection of the alert via the user interface device(s) 610, provisioning portal 104 displays, via output device(s) 612, information for the alert. This information may include one or more of a configuration of the component associated with the alert, a time at which the alert occurred, and/or a type of the alert.

As described above, provisioning portal 104 may display a plurality of second icons that represent second components providing Level-2 functionality for the O-RAN 5G infrastructure. In some examples, the number of components of a particular infrastructure level may number in the hundreds or thousands, and as such, may not be individually represented within UI 106 without unduly cluttering the representation and hindering comprehension by the user. In such a circumstance, provisioning portal 104 may reduce the number of icons displayed by UI 106 by using a single icon to represent multiple components so that UI 106 displays only as many icons as will reasonably fit within a display screen of a user.

In one example of the foregoing, provisioning portal 104 displays a first icon, the first icon comprising a single icon representing a first plurality of components within a particular layer of RAN 109. Further, provisioning portal 104 displays a second plurality of icons, each of the second plurality of icons representing a single component of a second plurality of components within the particular layer of RAN 109.

In response to receiving a selection of the first icon, provisioning portal 104 rearranges UI 106 to display a third plurality of icons, each of the third plurality of icons representing a single component of the first plurality of components within the particular layer of RAN 109. Further, provisioning portal 104 displays a fourth icon, the fourth icon comprising a single icon representing the plurality of second components within the particular layer of RAN 109.

In summary, provisioning portal 104 "collapses" the first plurality of components by representing the first plurality of components as a single icon and "expands" the second plurality of components by representing each of the second plurality of components as a single icon. In response to a user selecting the single icon representing the first plurality of components, provisioning portal 104 "expands" the first plurality of components by representing each of the first plurality of components as a single icon and "collapses" the second plurality of components by representing the second plurality of components as a single icon. In this fashion, UI 106, as described herein, may enable a user to clearly and readably understand the infrastructure and topology of RAN 109, even where a particular layer of RAN 109 includes large numbers of components which otherwise may not coherently be displayed within a single display window.

In some examples, provisioning portal 104, responsive to a selection of an icon representing a component of a particular layer of RAN 109, display, via output device(s) 612, information associated with the component. Such information may include, e.g., configuration, performance, events, or alarms related to the component In some examples, provisioning portal 104 displays, via output device(s) 612, a representation of a geographic location. Furthermore, provisioning portal 104 may position each of the icons representing components of RAN 109 on the representation of the geographic location. In this fashion, provisioning portal 104 may inform a user of a relative geographic position of each of the components of RAN 109.

In some examples, provisioning portal 104 arranges, via output device(s) 612, the plurality of first icons and the plurality of second icons according to a hierarchy of respective components of the plurality of first components and the plurality of second components within the O-RAN 5G infrastructure. In this fashion, provisioning portal 104 may inform a user of a hierarchy of respective components of RAN 109, as well as convey which lower-level components are managed by components of a higher level within RAN 109.

In some examples, provisioning portal 104 arranges, via output device(s) 612, the plurality of first icons and the plurality of second icons according to a hub-and-spoke model of respective components of the plurality of first components and the plurality of second components within the O-RAN 5G infrastructure.

In some examples, provisioning portal 104 provides expanding and collapsing functions to show and/or hide icons corresponding to components of different levels of the infrastructure of RAN 109. For example, provisioning portal 104 receives, via user interface device(s) 610, a first selection of the first icon of the first plurality of icons, the first icon corresponding to a component providing Level-1 functionality for RAN 109. Responsive to the first selection, provisioning portal 104 displays a second plurality of icons corresponding to second components providing Level-2 functionality for RAN 109. Subsequently, provisioning portal 104 receives, via user interface device(s) 610, a second selection of the first icon of the first plurality of icons. Responsive to the second selection of the first icon, provisioning portal 104 displays, via output device(s) 612, the first plurality of icons and not the second plurality of icons.

In some examples, provisioning portal 104 provides filtering functions to enable US 106 to display icons corresponding to only those components of the infrastructure of RAN 109 fulfilling criteria provided by, e.g., a user. For example, provisioning portal 104 receives, via user interface device(s) 610, one or more filtering criteria. Responsive to receiving the one or more filtering criteria, computing device 600 may display, via output device(s) 612, a subset of icons, each icon of the subset of icons representing one or more of a plurality of components that have one or more attributes matching the one or more filtering criteria. In some examples, the filtering criteria may include, e.g., a device model, a software version, a customer, a geographic location, etc.

Figure 7A:
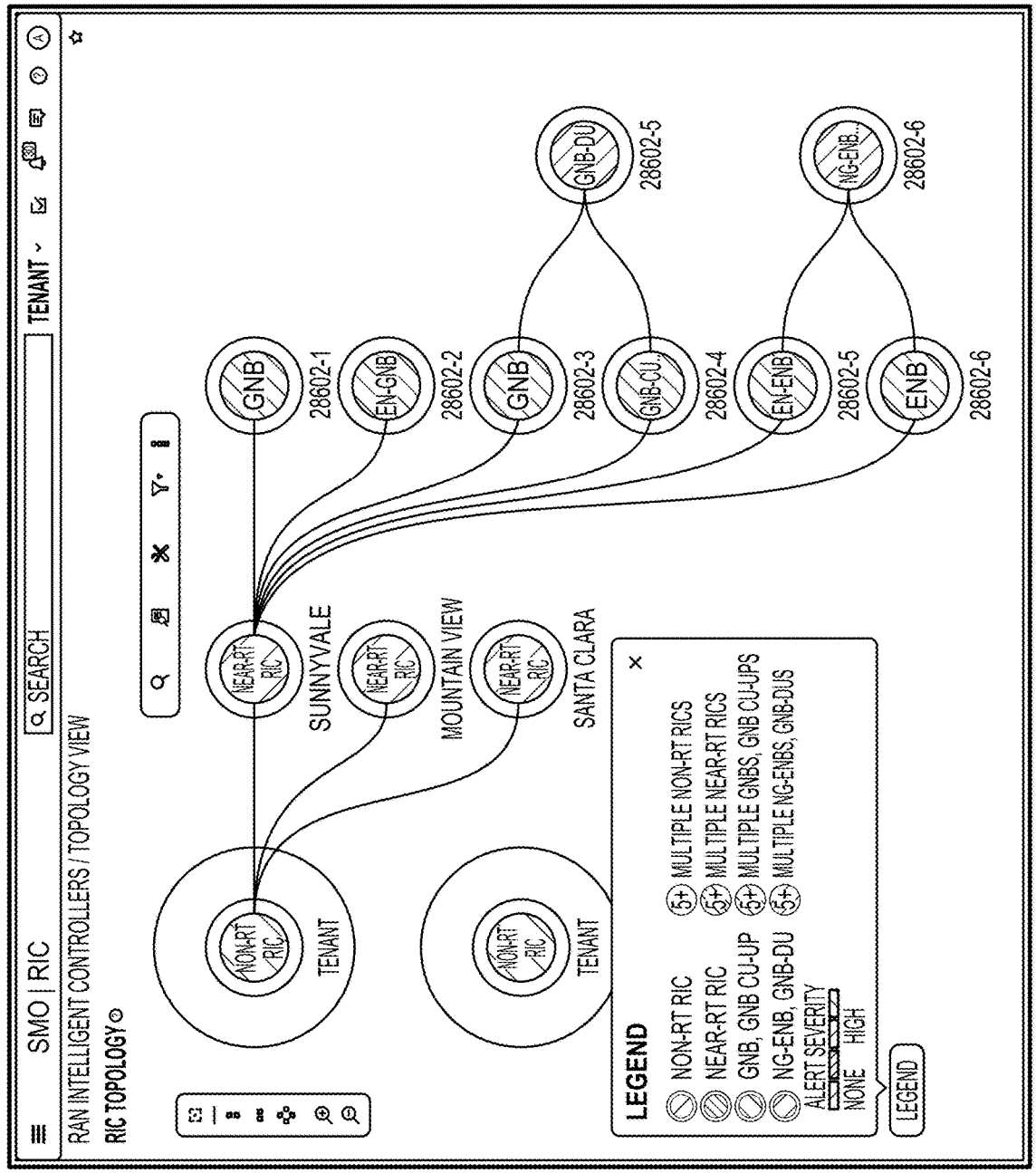
FIGS. 7A-7S are conceptual views of example user interfaces for representing a topology of a RAN in accordance with the techniques of the disclosure.
Figure 7B:
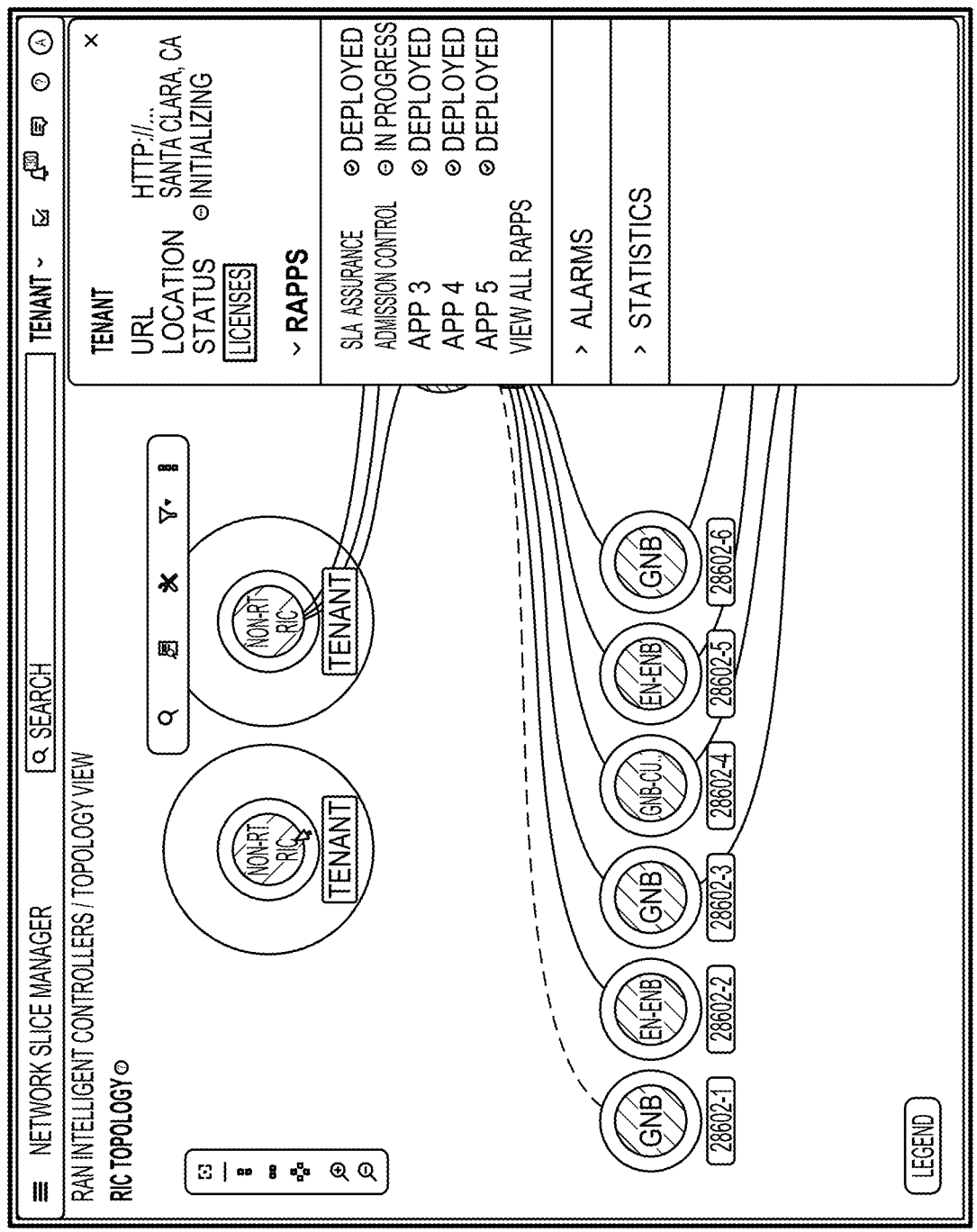
Figure 7C:
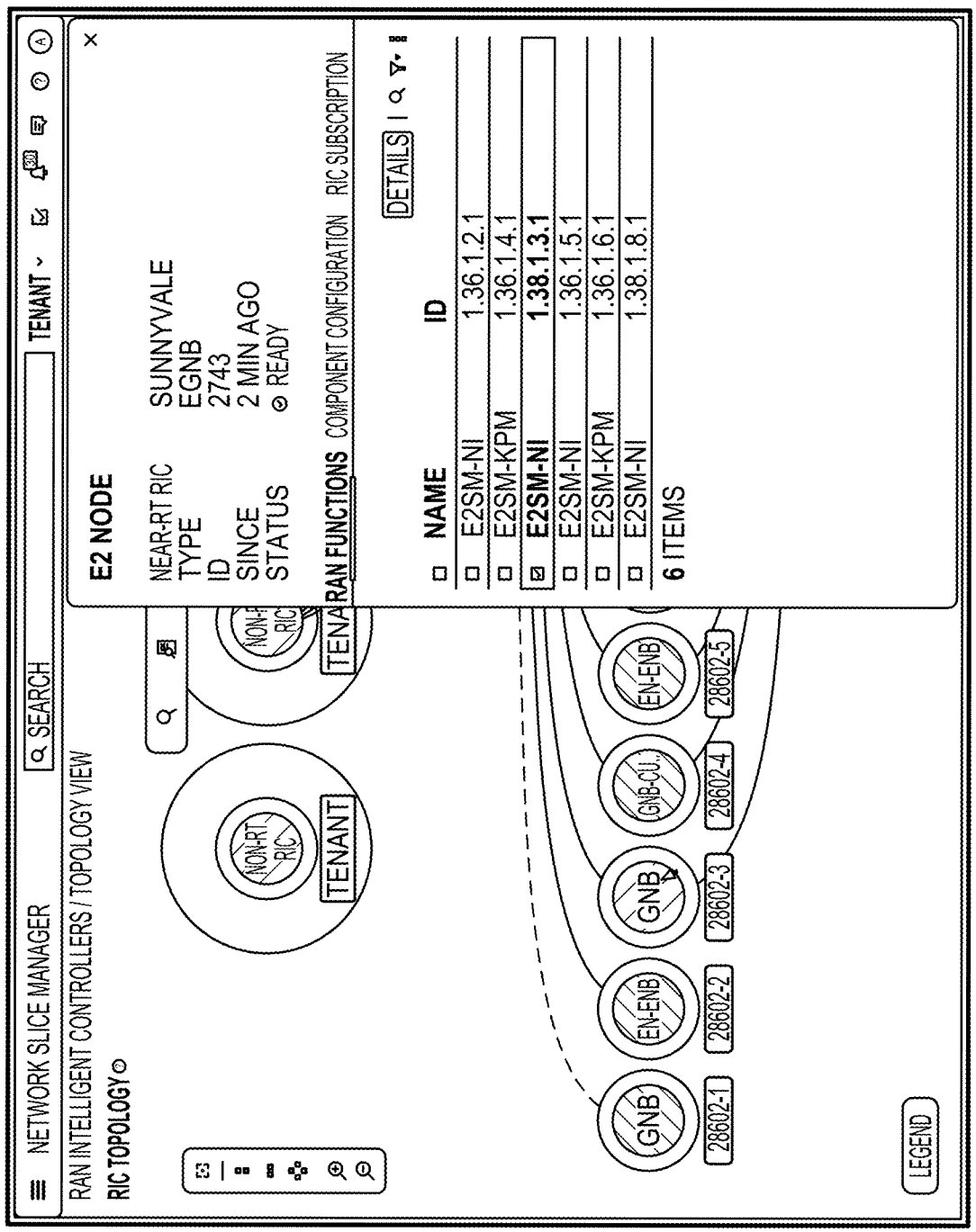
Figure 7D:
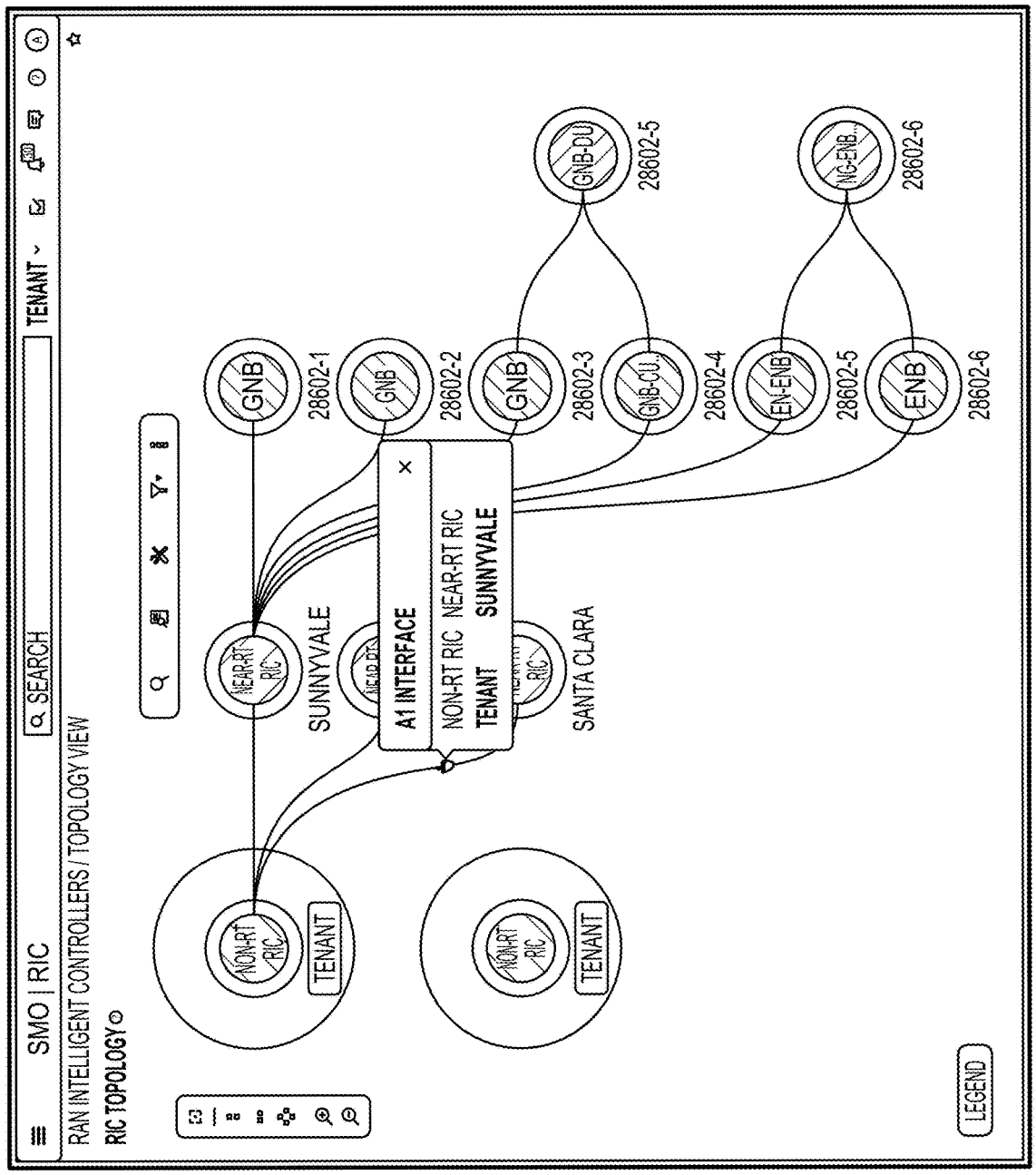
Figure 7E:
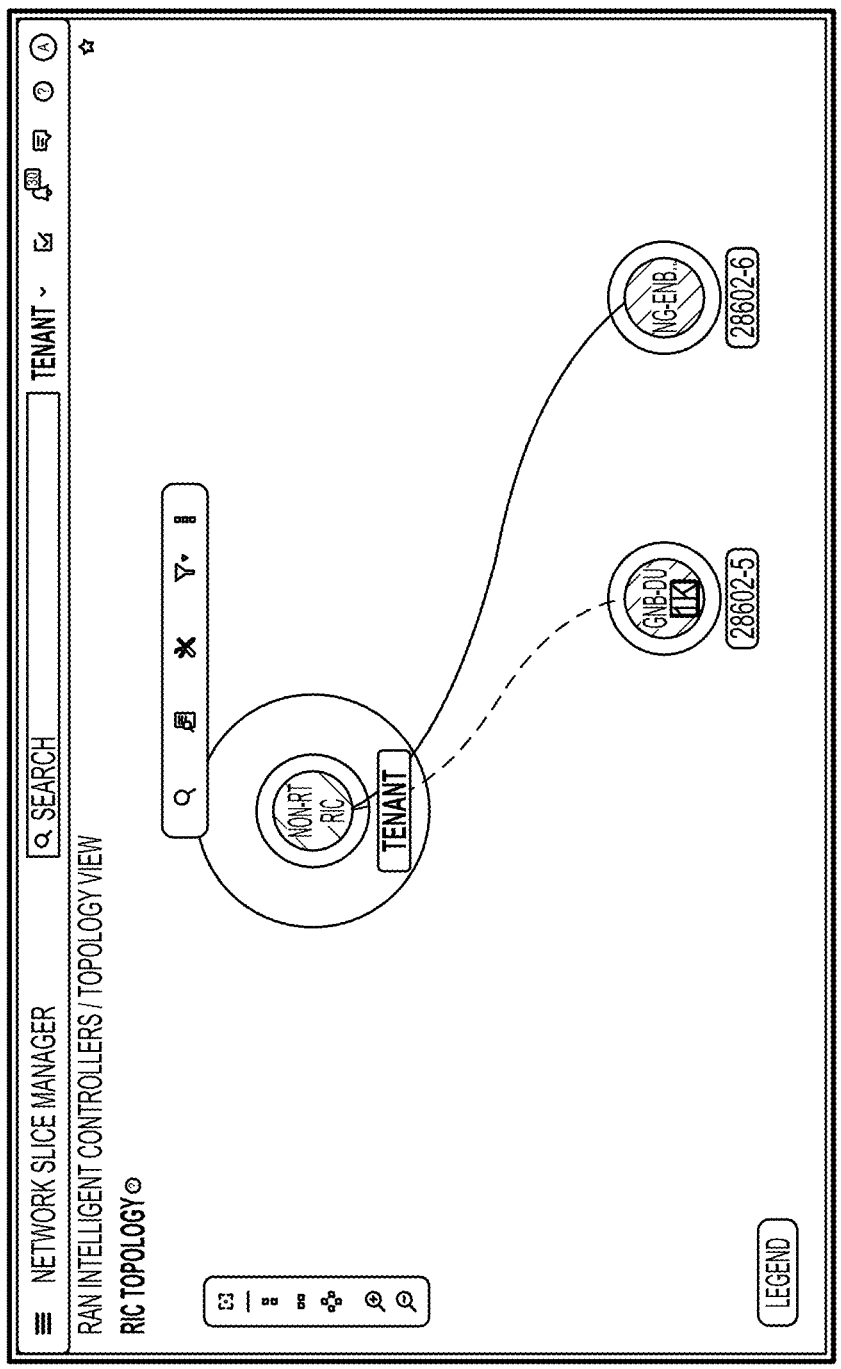
Figure 7F:
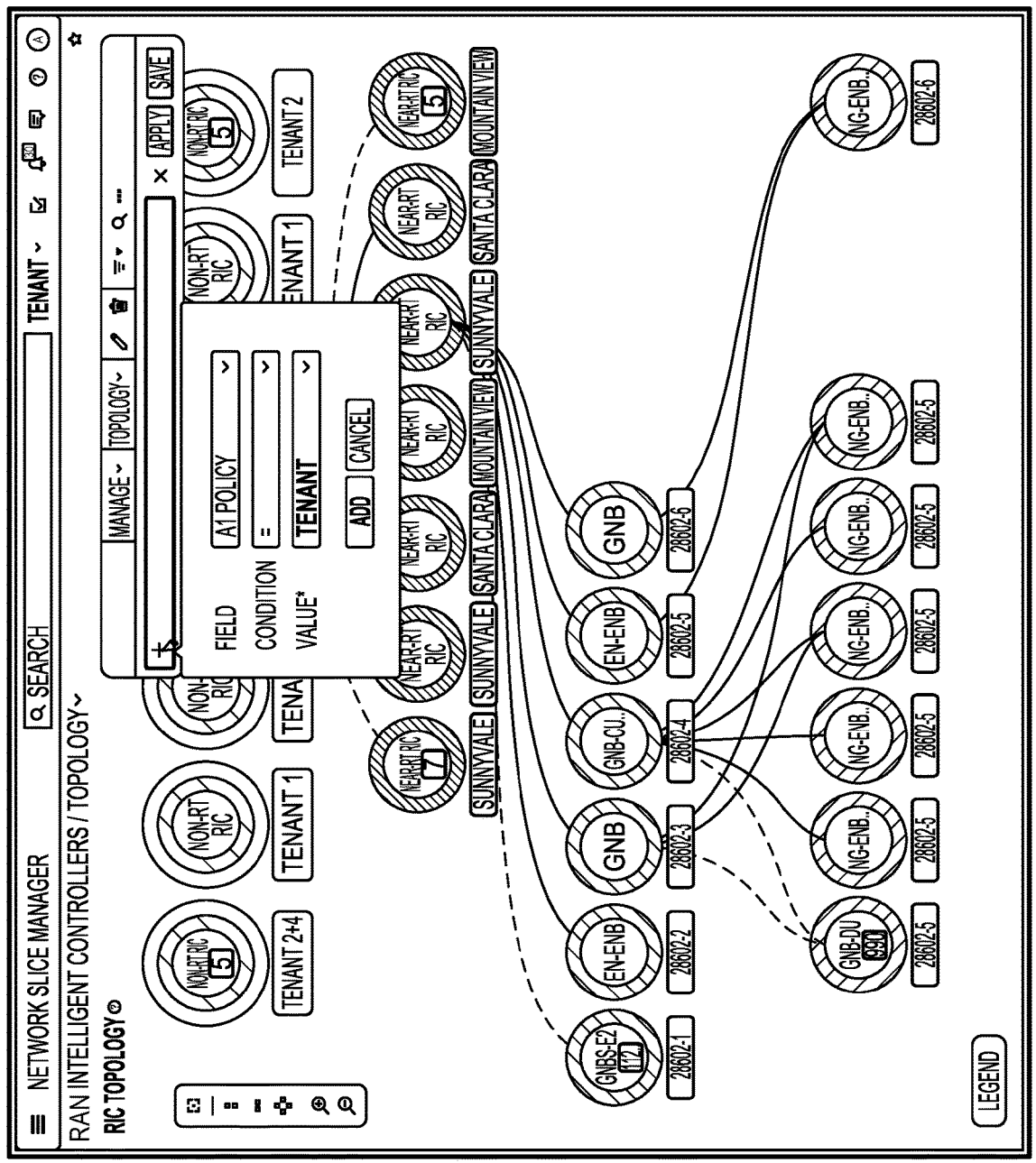
Figure 7G:
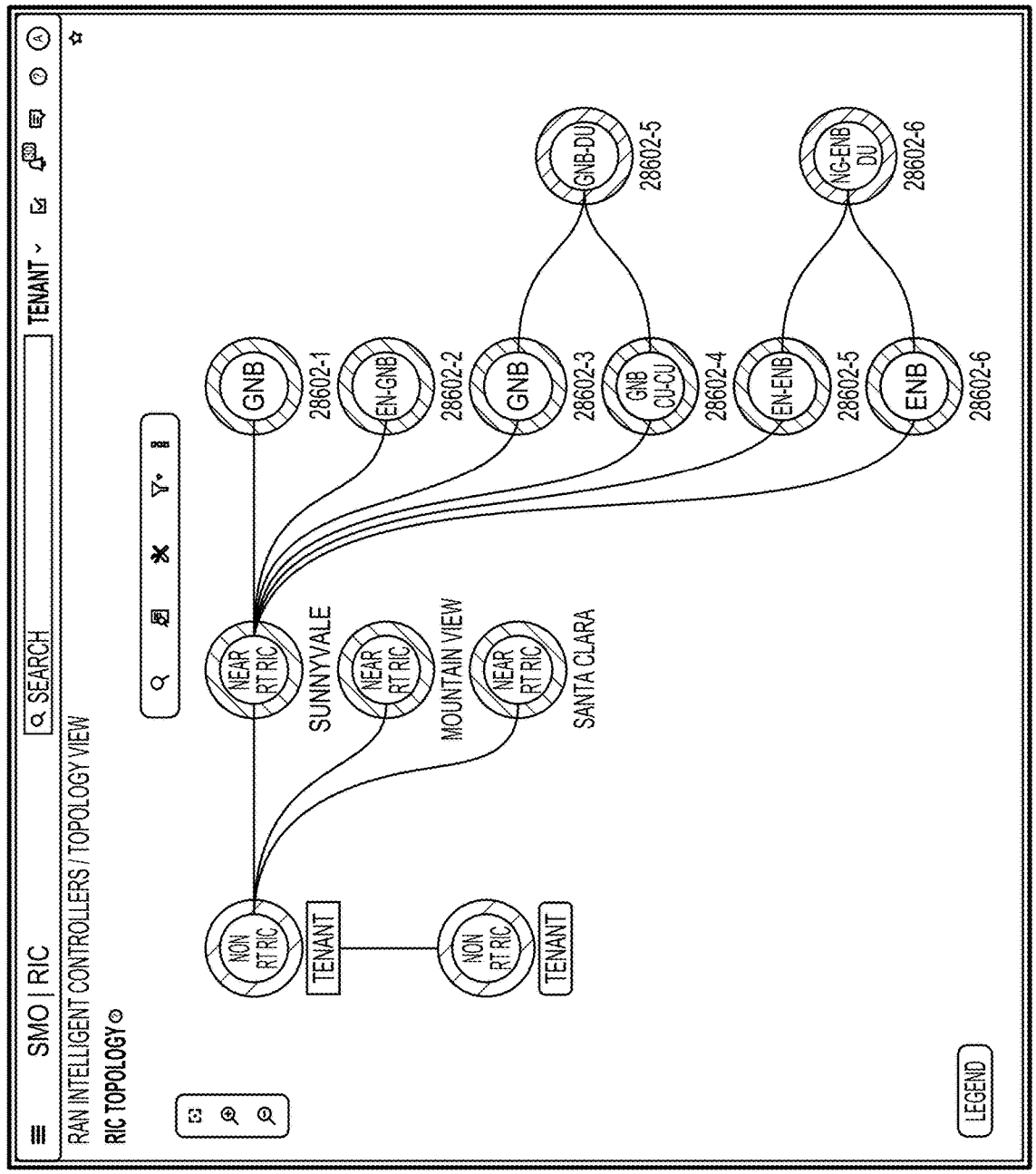
Figure 7H:
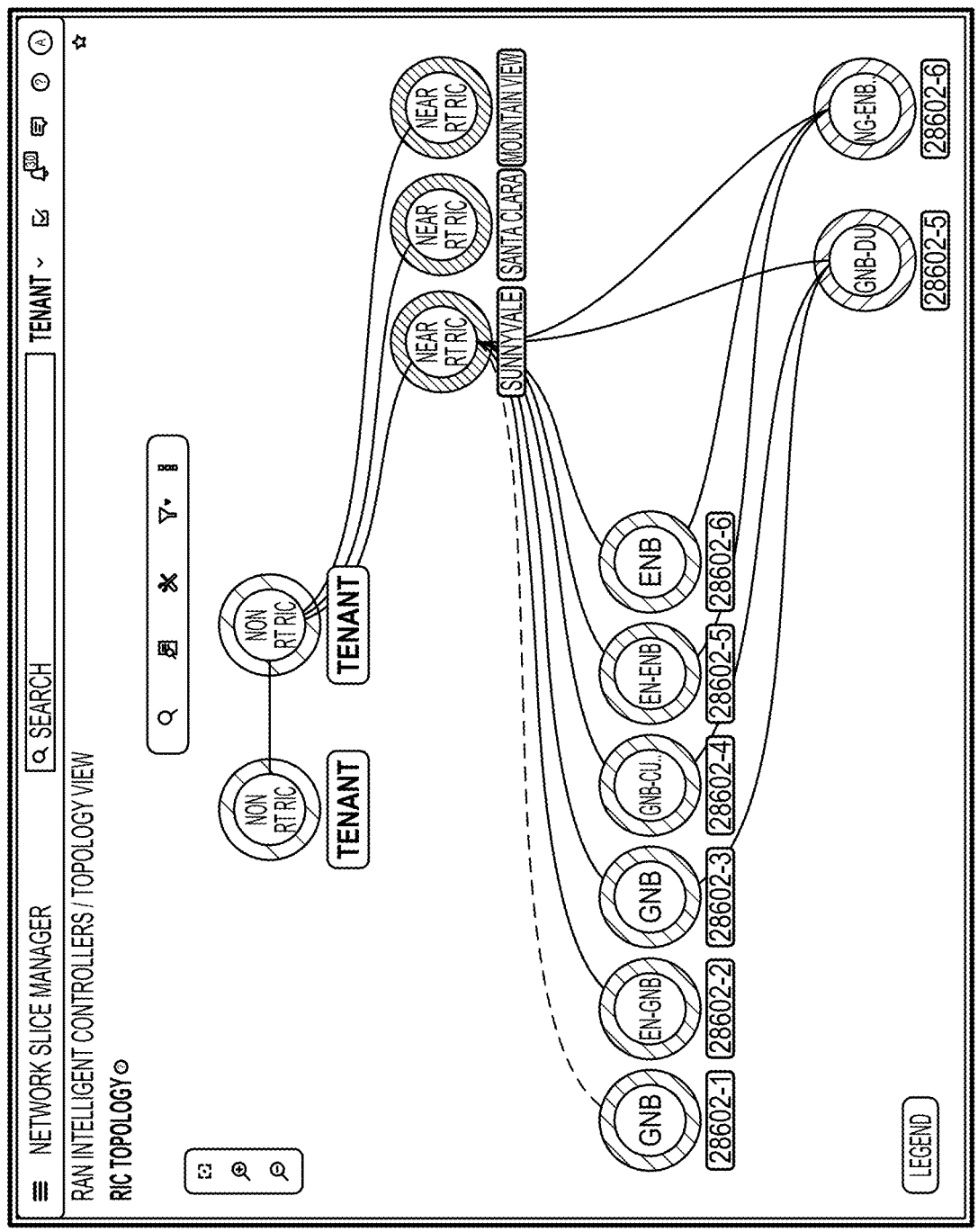
Figure 7I:
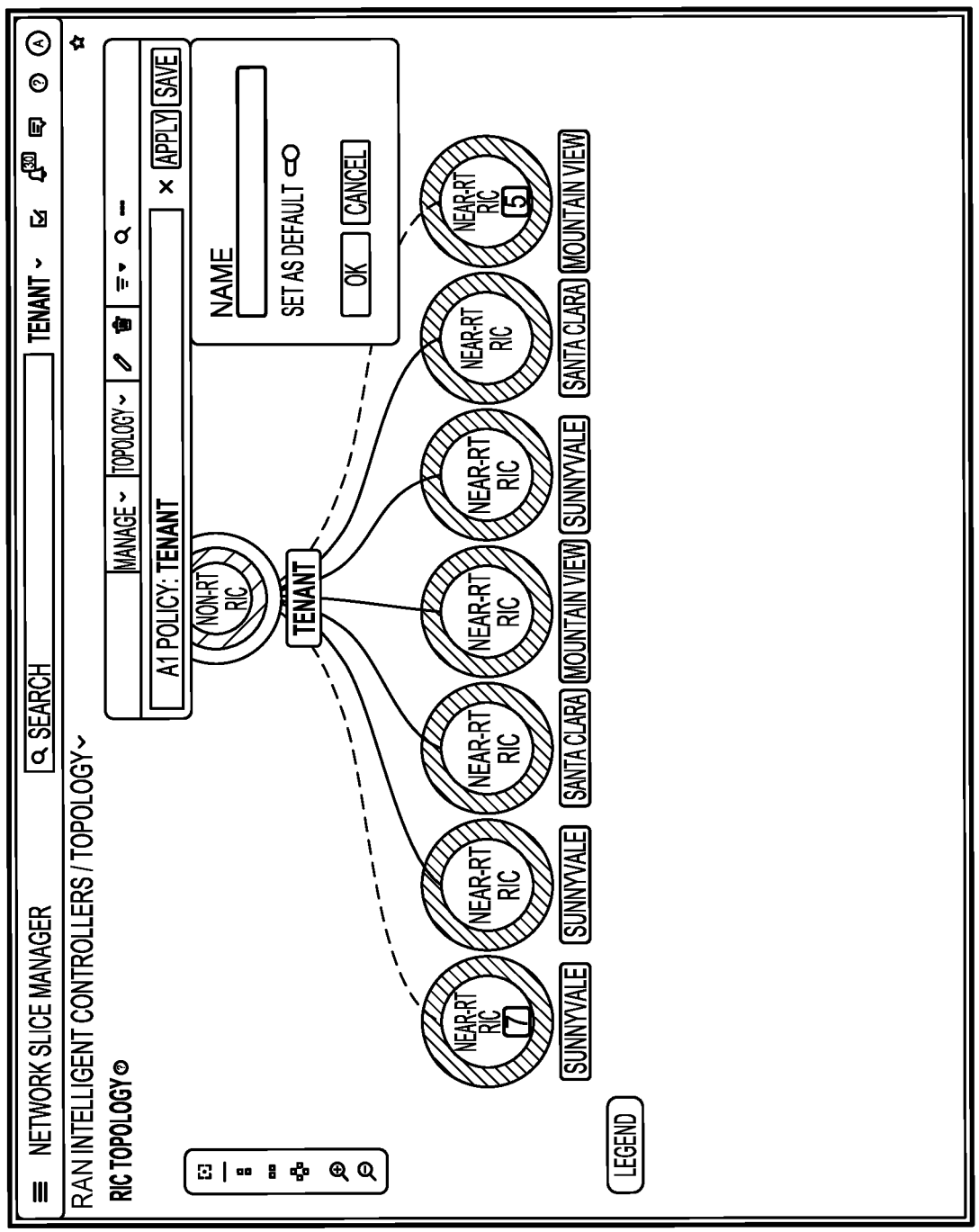
Figure 7J:
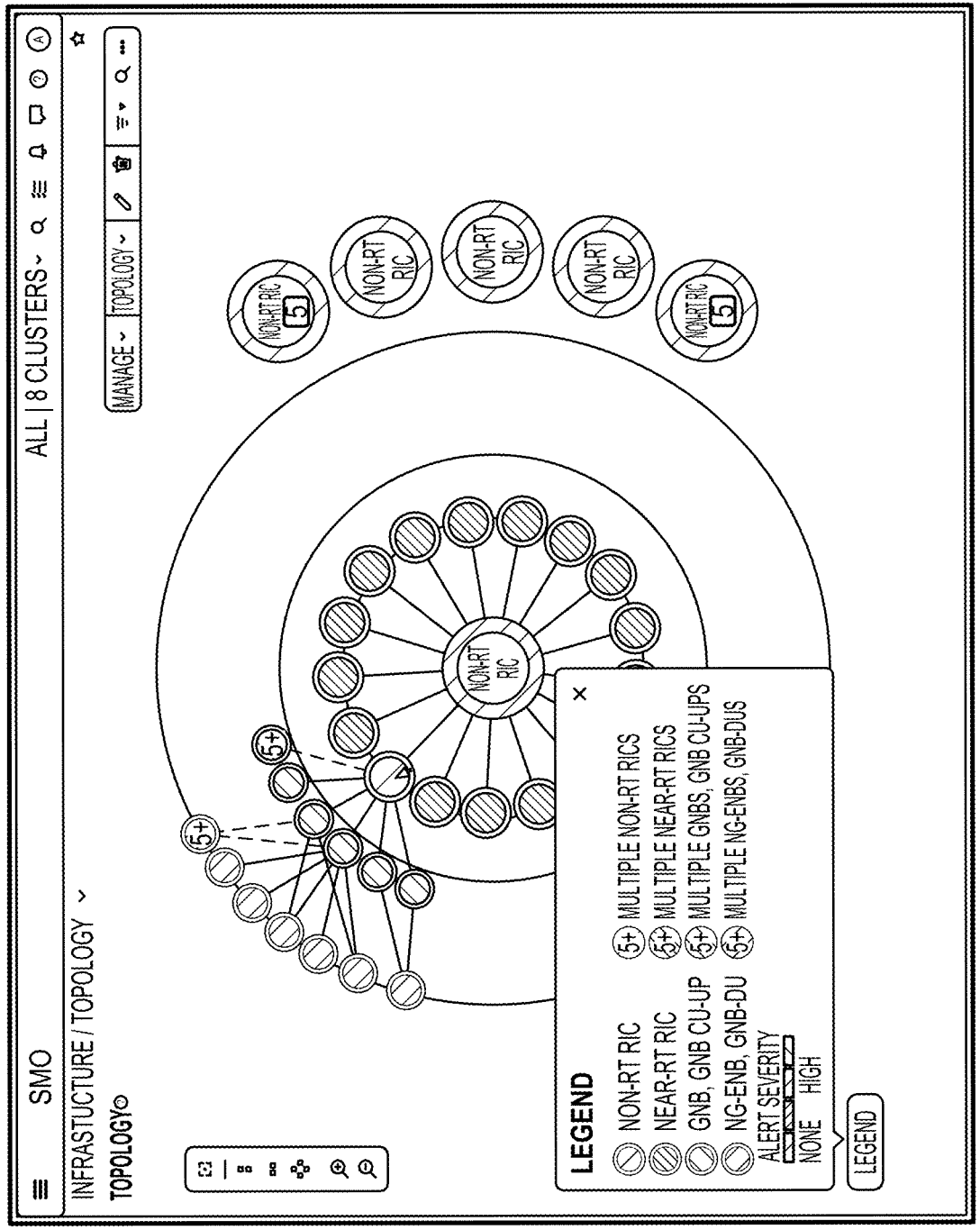
Figure 7K:
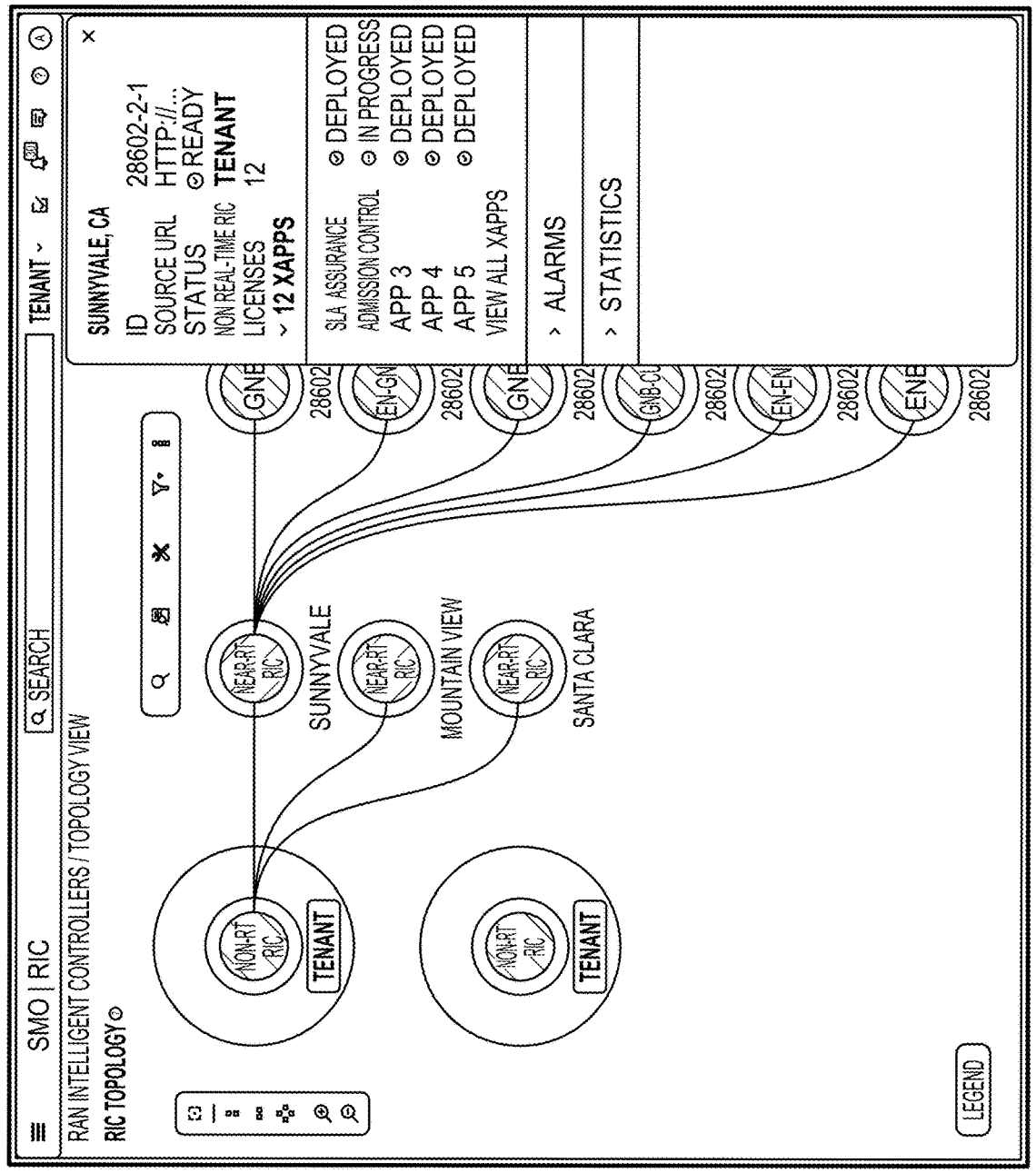
Figure 7L:
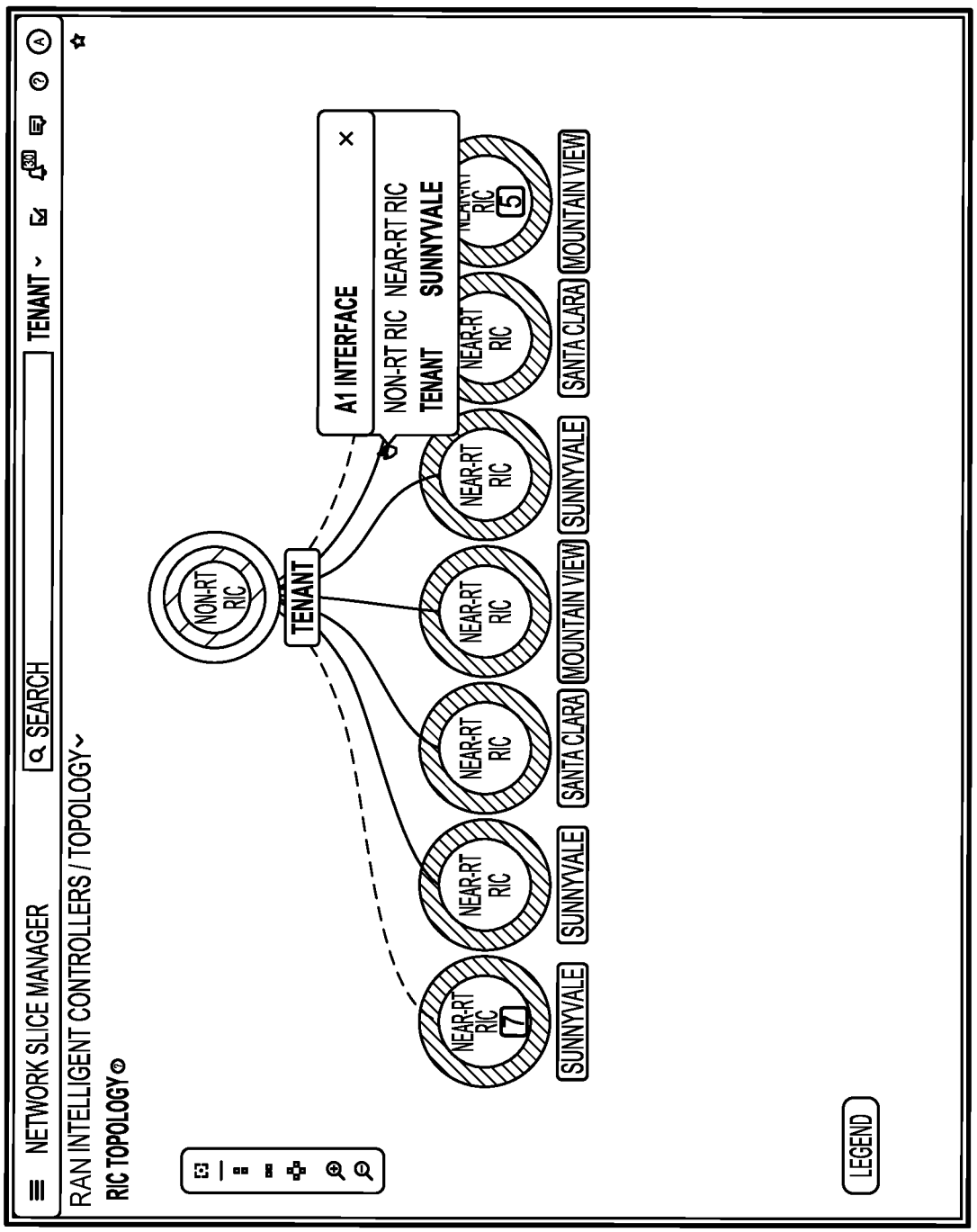
Figure 7M:
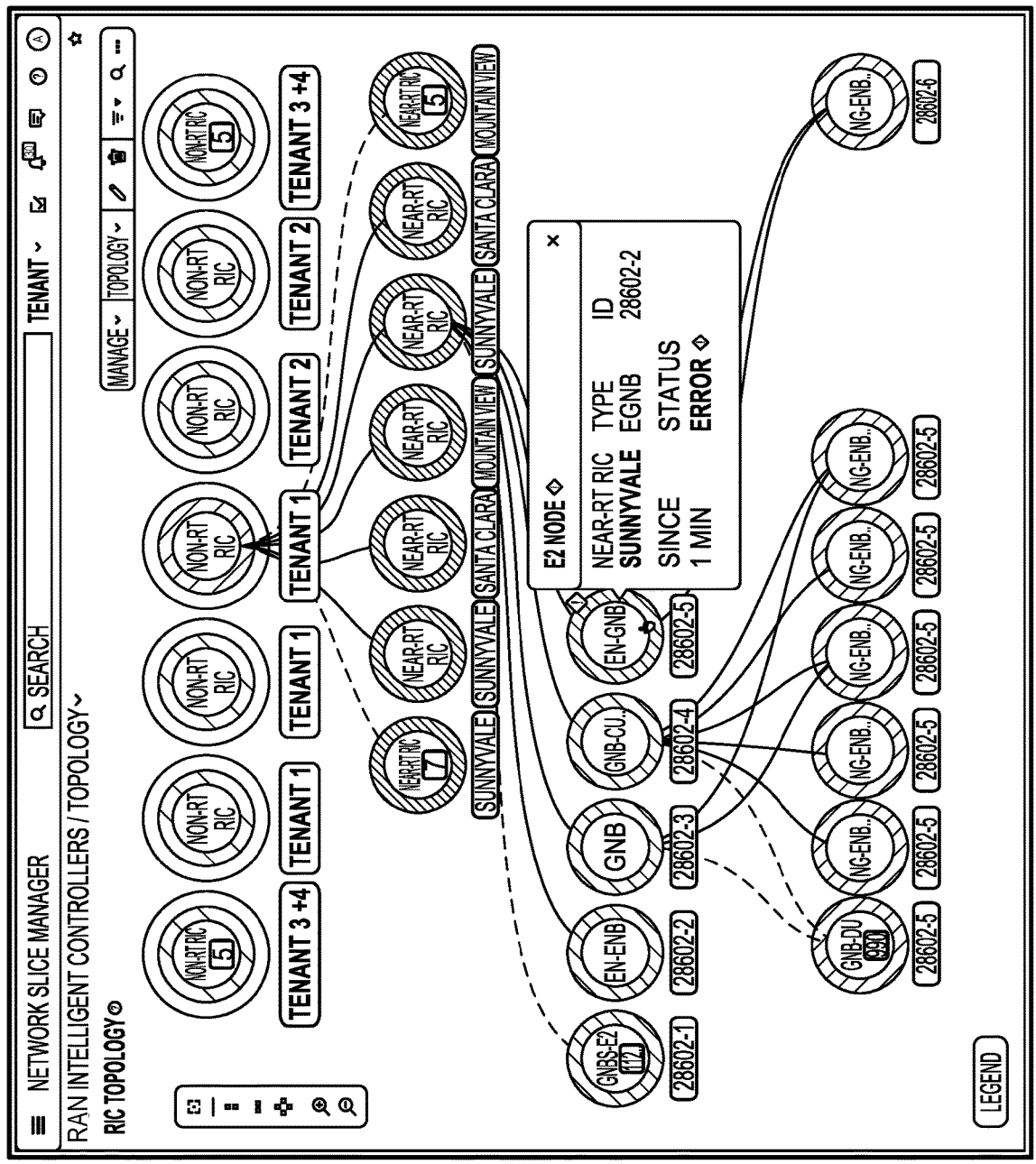
Figure 7N:
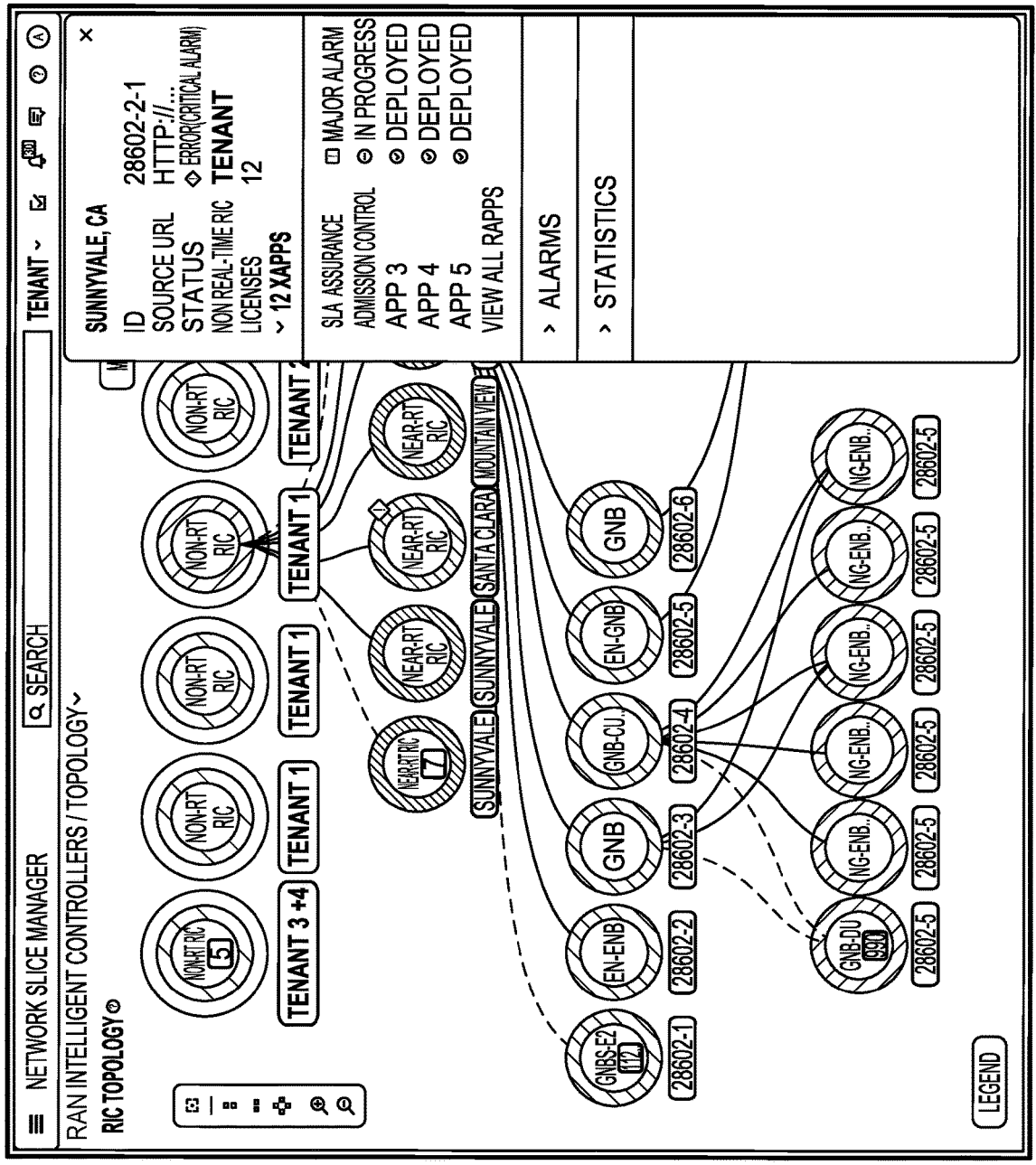
Figure 70:
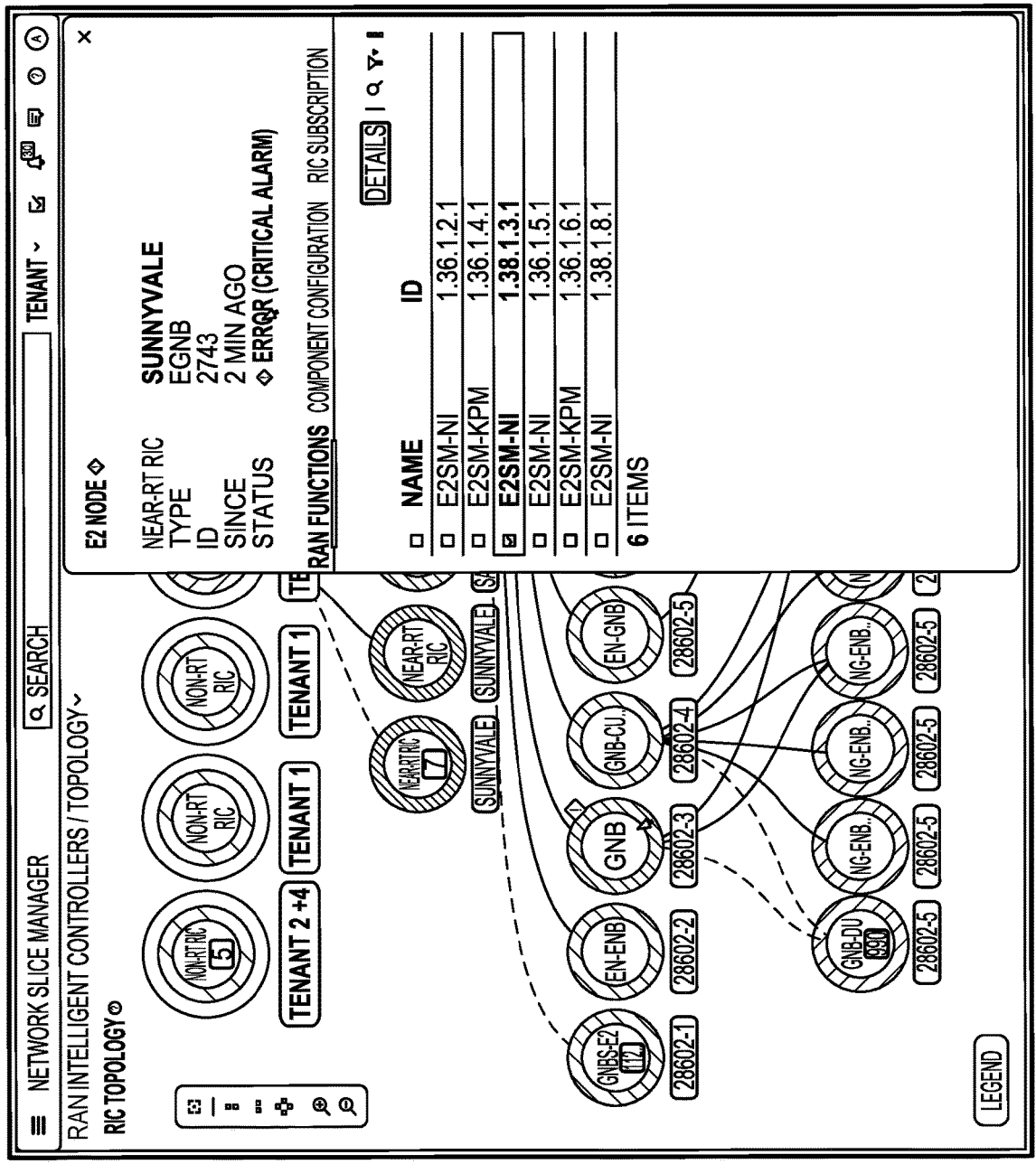
Figure 7P:
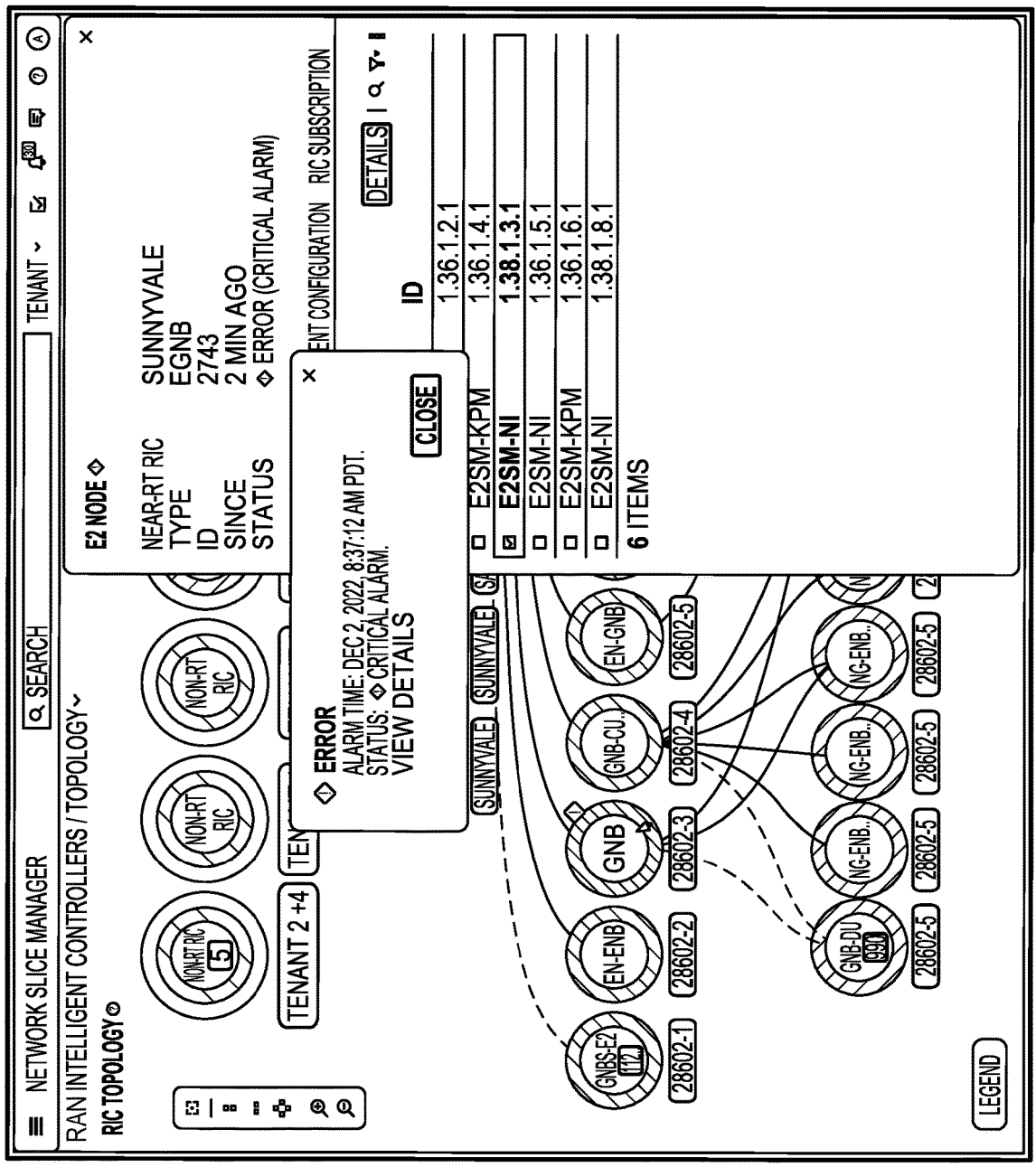
Figure 7Q:
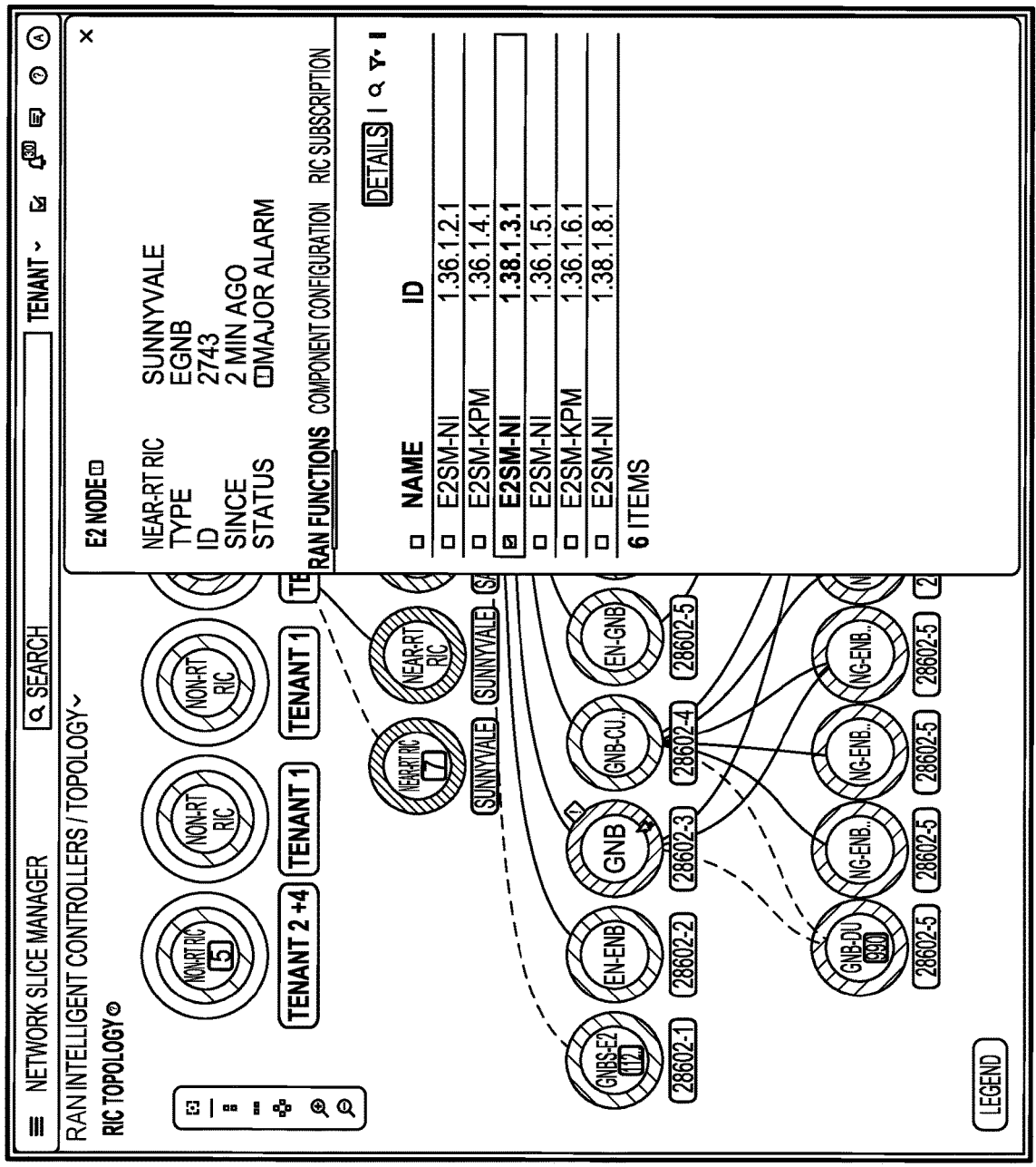
Figure 7R:
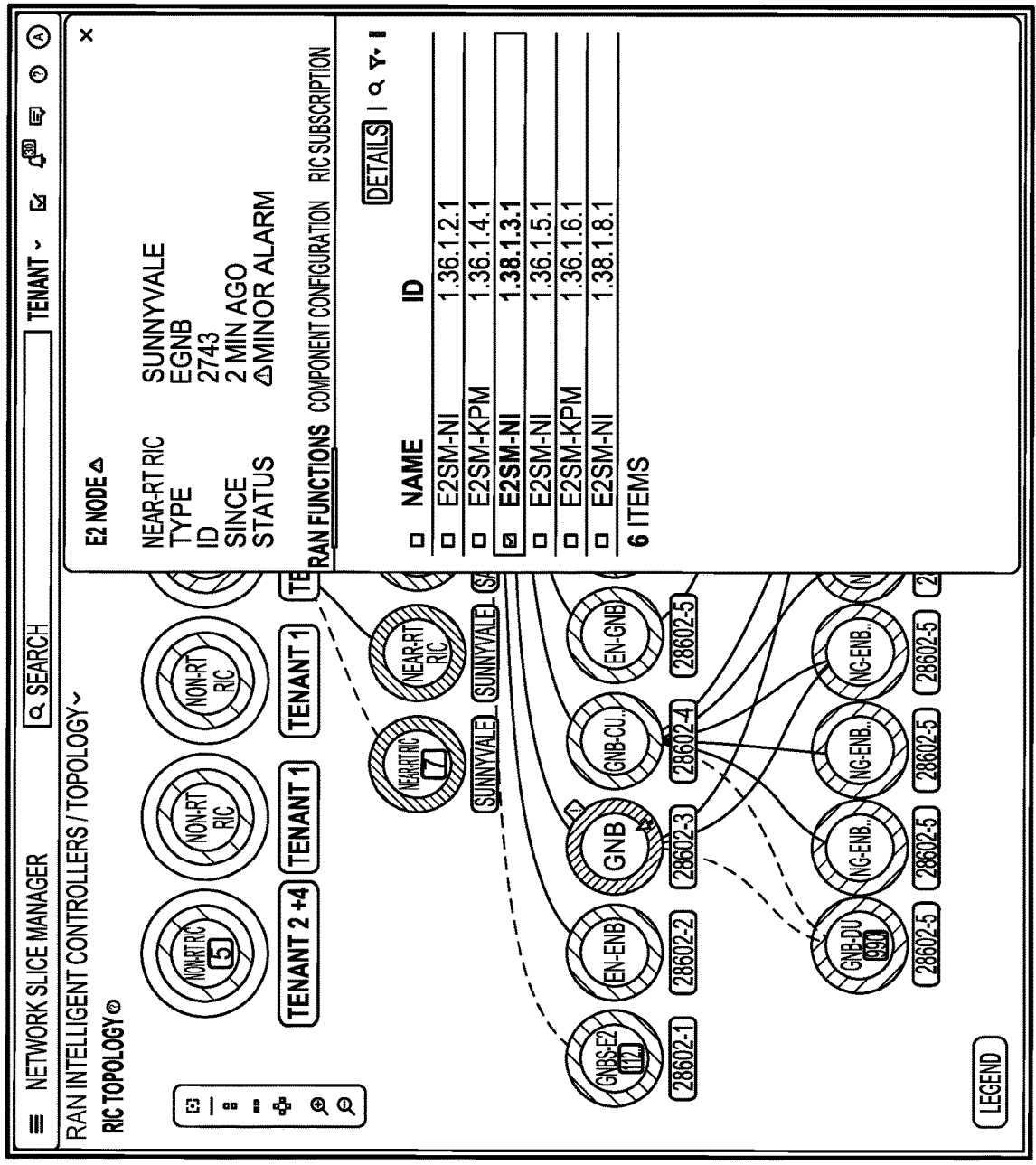

FIGS. 7A-7R are conceptual views of example user interfaces for representing a topology of a RAN in accordance with the techniques of the disclosure.

FIG. 7A is a conceptual view of an example user interface for representing a topology of a RAN in accordance with the techniques of the disclosure. FIG. 7A illustrates a user interface showing a hierarchical configuration of a RAN, such as RAN 109 of FIG. 1, which includes non-RT RICs, near-RT RICs, gNB nodes, en-gNB nodes, gNB-CU-UP nodes, en-eNB nodes, eNB nodes, gNB-DU nodes, and ng-eNB nodes.

FIG. 7B is a conceptual view of an example user interface for representing a topology of a RAN in accordance with the techniques of the disclosure. FIG. 7B illustrates a user interface showing a hierarchical configuration of a RAN, such as RAN 109 of FIG. 1, which includes non-RT RICs, gNB nodes, en-eNB nodes, and gNB-CU-UP nodes. The user interface of FIG. 7B additionally includes a window depicting a listing of rApps, alarms, and statistics for a non-RT RIC corresponding to the icon selected via mouse cursor.

FIG. 7C is a conceptual view of an example user interface for representing a topology of a RAN in accordance with the techniques of the disclosure. FIG. 7C illustrates a user interface showing a hierarchical configuration of a RAN, such as RAN 109 of FIG. 1. FIG. 7C additionally illustrates a window depicting attributes of a gNB node corresponding to the icon selected via mouse cursor. The attributes include, e.g., RAN functions, component configuration, RIC subscription, status of the component (e.g., "Ready", "Disabled", etc.), ID of the selected component, and time duration since last status update.

FIG. 7D is a conceptual view of an example user interface for representing a topology of a RAN in accordance with the techniques of the disclosure. The user interface of FIG. 7D illustrates a selection of an A1 interface between a non-RT RIC and a near-RT RIC via a mouse cursor of a user. As depicted in the example of FIG. 7D, responsive to the selection, the user interface displays a window depicting attributes regarding the A1 interface.

FIG. 7E is a conceptual view of an example user interface for representing a topology of a RAN in accordance with the techniques of the disclosure. The user interface of FIG. 7E includes a UI element for filtering components of the RAN according to one or more user-defined fields.

FIG. 7F is a conceptual view of an example user interface for representing a topology of a RAN in accordance with the techniques of the disclosure. The user interface of FIG. 7F includes a UI element for filtering components of the RAN according to one or more user defined fields such as "Field", "Condition", and "Value".

FIG. 7G is a conceptual view of an example user interface for representing a topology of a RAN in accordance with the techniques of the disclosure. The user interface of FIG. 7G includes icons representing components across multiple levels of infrastructure of a RAN, such as RAN 109 of FIG. 1. The user interface of FIG. 7G further represents the components in a hierarchical fashion across multiple levels of an O-RAN infrastructure (e.g., the icons representing gNB and en-gNB nodes are shown to derive from an icon representing a near-RT RIC). The user interface may further display a topology in response to a user selection of an icon representing a near-RT RIC or an icon representing an E2 node displayed by the user interface.

FIG. 7H is a conceptual view of an example user interface for representing a topology of a RAN in accordance with the techniques of the disclosure. The user interface of FIG. 7H depicts icons representing components of the infrastructure of a RAN in a similar fashion as FIG. 7G, but in a different visual orientation.

FIG. 7I is a conceptual view of an example user interface for representing a topology of a RAN in accordance with the techniques of the disclosure. The user interface of FIG. 7I represents components of the infrastructure of a RAN, wherein a single icon is used to represent a plurality of Near-RT RICs. Responsive to a user selection of the rightmost icon (i.e., the icon labeled as "Near-RT RIC 5), provisioning portal 104 of FIG. 6 may display icons each representing single components collapsed under the rightmost icon while collapsing the currently displayed icons into the leftmost icon (i.e., the icon labeled as "Near-RT RIC 7").

FIG. 7J is a conceptual view of an example user interface for representing a topology of a RAN in accordance with the techniques of the disclosure. The user interface of FIG. 7J provides a visual organization of a RAN, such as RAN 109 of FIG. 1, wherein the components are visually arranged in a hub-and-spoke orientation. The user interface of FIG. 7J additionally presents a legend of the icons, including visual indicators such as a type of RAN component, level of alert severity, etc.

FIG. 7K is a conceptual view of an example user interface for representing a topology of a RAN in accordance with the techniques of the disclosure. The user interface of FIG. 7K receives a selection of an icon via a mouse cursor of a user. In response to the selection, the user interface presents a window displaying attributes of the component corresponding to the icon, such as "ID", "Source URL", "Status", "Non Real-Time RIC", "Licenses" as well as "xApps" (e.g., the count of xApps, respective names of the xApps, and the status of applications associated with the component), "Alarms" and "Statistics."

FIG. 7L is a conceptual view of an example user interface for representing a topology of a RAN in accordance with the techniques of the disclosure. The user interface of FIG. 7L depicts a sliding view of collapsed icons similar to the user interface illustrated in FIG. 7I. The user interface of FIG. 7L further illustrates a selection of an A1 interface between a non-RT RIC and a near-RT RIC via a mouse cursor of a user. As depicted in the example of FIG. 7L, responsive to the selection, the user interface displays a window depicting attributes regarding the A1 interface.

FIG. 7M is a conceptual view of an example user interface for representing a topology of a RAN in accordance with the techniques of the disclosure. The user interface of FIG. 7M illustrates the selection of an icon via a mouse cursor of a user. Responsive to the selection, the user interface presents a window depicting an alert notification for a component corresponding to the selected icon. The alert notification includes a list of attributes of the corresponding component, including an associated near-RT RIC, a type of component represented by the icon ("en-gNB"), an ID of the node ("28602-2"), a status of the node ("Error"), and a duration of the status of the node ("1 min").

FIG. 7N is a conceptual view of an example user interface for representing a topology of a RAN in accordance with the techniques of the disclosure. The user interface of FIG. 7N illustrates a window depicting a high priority alert status for a component within the RAN. The window provides additional information within the user interface containing multiple attributes of the component experiencing the high priority alert status. The window further provides data regarding multiple attributes regarding the component, including but not limited to a status of the component ("Error(Critical Alarm)"), an SLA Assurance status ("Major Alarm"), and Admission Control ("In Progress").

FIG. 7O is a conceptual view of an example user interface for representing a topology of a RAN in accordance with the techniques of the disclosure. The user interface of FIG. 7O receives a selection of an icon via a mouse cursor of a user. The icon depicts a high priority or "critical" alert status for a component of the RAN corresponding to the icon similar to the user interface of IG. 7N. In response to the selection, the user interface presents an information panel that displays multiple attributes of the component represented by the icon, including but not limited to a list of RAN functions, data regarding the configuration of the component, the RIC subscription, and the status of the component ("Error (Critical Alarm)").

FIG. 7P is a conceptual view of an example user interface for representing a topology of a RAN in accordance with the techniques of the disclosure. The user interface of FIG. 7P presents an alert notification panel for a component of the RAN. As depicted in the example of FIG. 7P, the alert notification panel includes information regarding the alert such as an Alarm Time, a status of the component ("Critical Alarm") and a user-interactable tab to view further information regarding the alert. The user interface may further include a list of alarms sorted by severity (e.g., "Critical", "Major", and "Minor") as well as a brief description of the nature of each of the respective alarms and the date and time of the alarm.

FIG. 7Q is a conceptual view of an example user interface for representing a topology of a RAN in accordance with the techniques of the disclosure. The user interface of FIG. 7Q receives a selection of an icon via a mouse cursor. The selected icon depicts a component of the RAN as having a "major" alarm status. In response to the selection, the user interface of FIG. 7Q presents an information panel that displays information for the component corresponding to the selected icon, such as a current status ("Major Alarm").

FIG. 7R is a conceptual view of an example user interface for representing a topology of a RAN in accordance with the techniques of the disclosure. The user interface of FIG. 7R receives a selection of an icon via a mouse cursor. The selected icon depicts a component of the RAN as having as having a "minor" alarm status. In response to the selection, the user interface of FIG. 7R presents an information panel that displays information regarding the selected node such as the current status ("Minor Alarm").

Figure 7S:
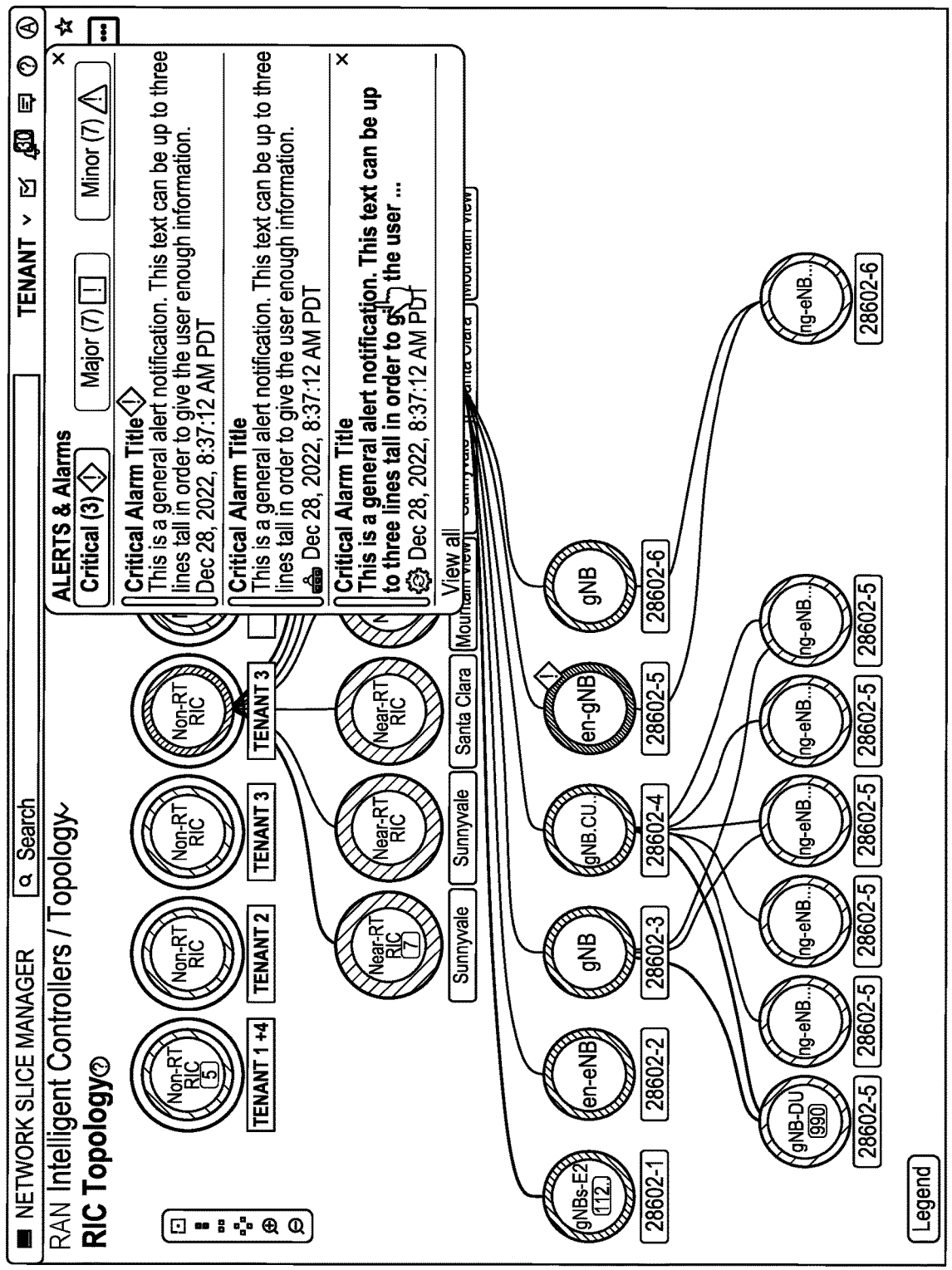

FIG. 7S is a conceptual view of an example user interface for representing a topology of a RAN in accordance with the techniques of the disclosure. The user interface of FIG. 7S presents an information panel that displays information regarding alerts and alarms related to the selected node.

Figure 8A:
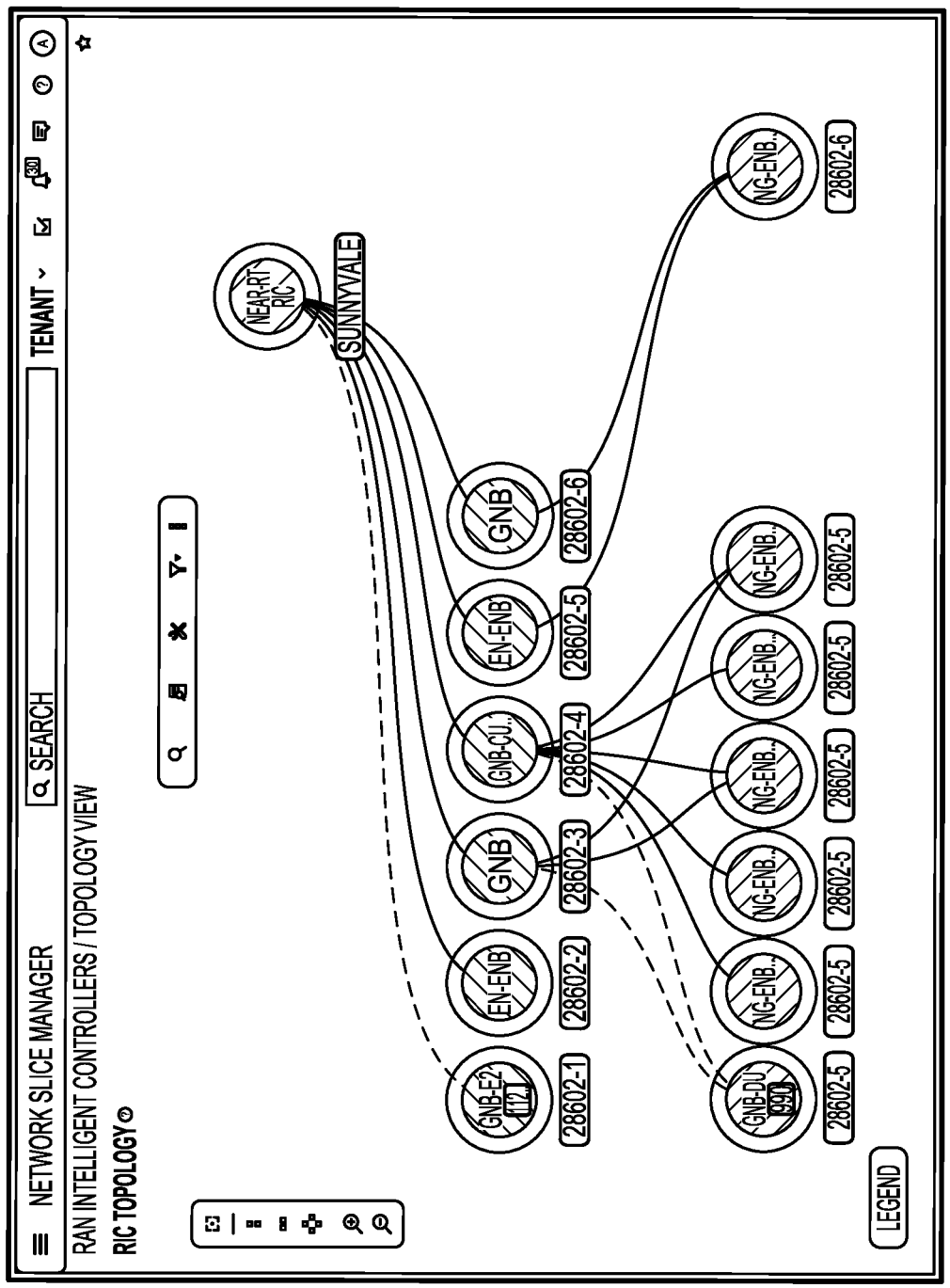
FIGS. 8A-8B are conceptual views of example user interfaces for representing a topology of a RAN in accordance with the techniques of the disclosure.
Figure 8B:
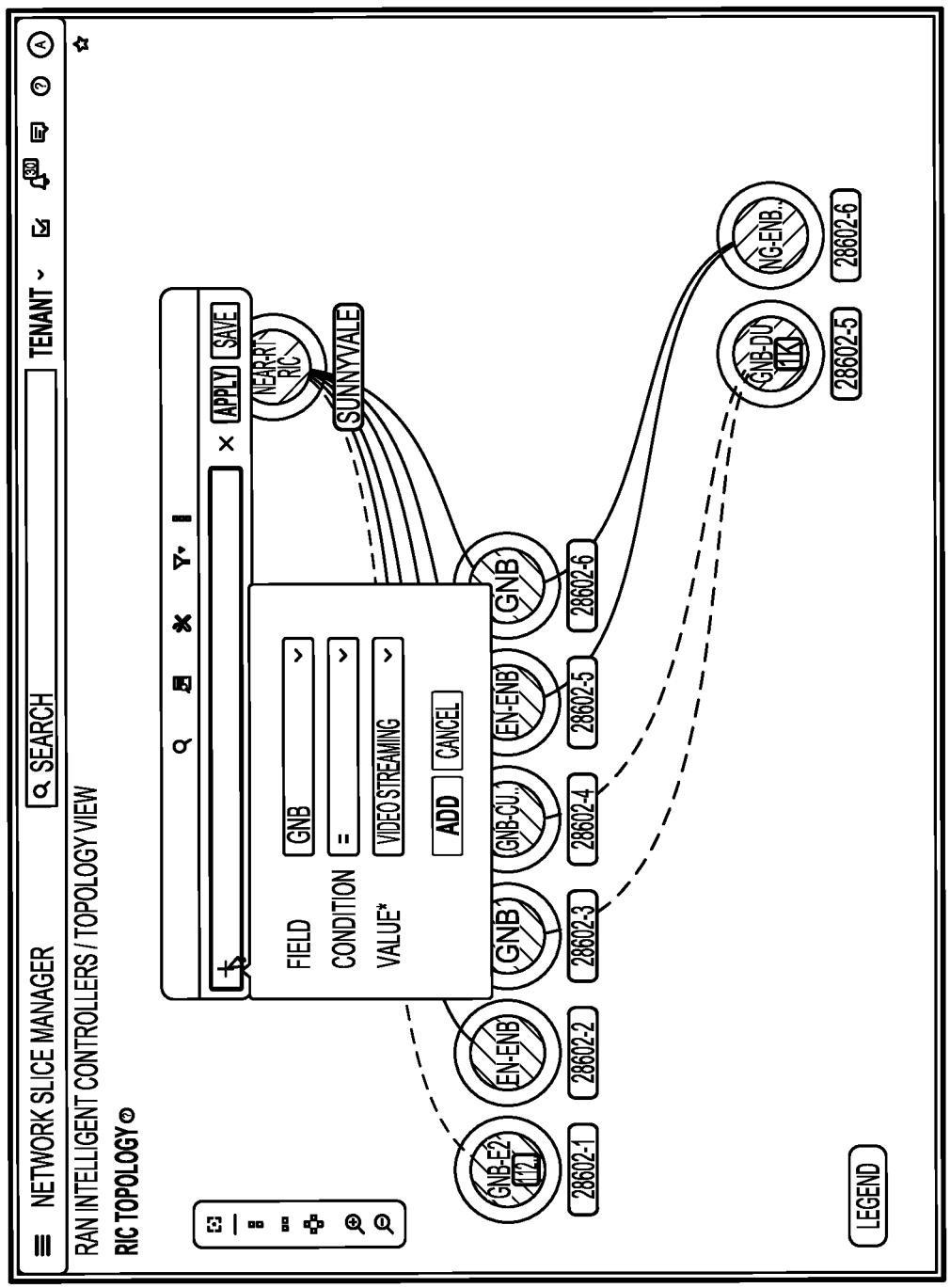

FIG. 8A and FIG. 8B are conceptual views of example user interfaces for representing a topology of a RAN in accordance with the techniques of the disclosure. FIG. 8A and FIG. 8B illustrate a change in the user interface in response to selection of a filtering UI element by a user. For example, FIG. 8A illustrates a conceptual view of a user interface that depicts a representation of a RAN and a filter UI element (illustrated by the bar in the top center of FIG. 8A containing multiple icons such as a magnifying glass and a funnel). FIG. 8B illustrates the user interface of FIG. 8A, following the user selection of the filtering tool (represented by the icon in the shape of a funnel). As depicted in FIG. 8B, the filtering tool contains multiple options for the user to filter the components of the RAN (e.g., by type of node, current condition, and value). The filtering tool depicted in FIG. 8B additionally includes the option for a user to filter by non-RT RIC name, near-RT RIC name, near-RT RIC ID, and E2 node ID.

Various examples have been described. These and other examples are within the scope of the following claims.

What is claimed is:

1. A computing system comprising processing circuitry having access to a memory, the processing circuitry configured to:
   display, via a user interface, a plurality of first icons, each icon of the plurality of first icons representing a plurality of first components providing Level-1 functionality for an Open Radio Access Network (O-RAN) 5G infrastructure;
   receive, via the user interface, a selection of a first icon of the plurality of first icons; and
   responsive to the selection of the first icon, display, via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

2. The computing system of claim 1,
   wherein the plurality of first components providing Level-1 functionality for the O-RAN 5G infrastructure comprise a plurality of non-real-time Radio Access Network (RAN) Intelligent Controllers (RICs), and
   wherein the plurality of second components providing Level-2 functionality for the O-RAN 5G infrastructure comprise a plurality of near-real-time RICs.

3. The computing system of claim 1, wherein the processing circuitry is further configured to:
   receive, via the user interface, a selection of a second icon of the plurality of second icons;
   responsive to the selection of the second icon, display, via the user interface, a plurality of third icons, each icon of the plurality of third icons representing a plurality of third components providing Level-3 functionality for the O-RAN 5G infrastructure, the plurality of third components managed by a component of the plurality of second components corresponding to the selected second icon;
   receive, via the user interface, a selection of a third icon of the plurality of third icons; and
   responsive to the selection of the third icon of the plurality of third icons, display, via the user interface, a plurality of fourth icons, each icon of the plurality of fourth icons representing a plurality of fourth components providing Level-4 functionality for the O-RAN 5G infrastructure, the plurality of fourth components managed by a component of the plurality of third components corresponding to the selected third icon.

4. The computing system of claim 3,
   wherein the plurality of components providing Level-3 functionality for the O-RAN 5G infrastructure comprise a plurality of gNodeB (gNB), gNodeB Control Unit-Control Plane (gNB CU-CP), or gNodeB Control Unit-User Plane (gNB CU-UP) nodes,
   wherein the plurality of components providing Level-4 functionality for the O-RAN 5G infrastructure comprise a plurality of Next Generation e-NodeB (ng-eNB) or gNodeB Distributed Unit (gNB-DU) nodes.

5. The computing system of claim 1, wherein the processing circuitry is further configured to:
   display, via the user interface, an alert associated with a component of the plurality of first components or the plurality of second components;

in response to receiving a selection of the alert via the user interface, display, via the user interface, information for the alert, wherein the information includes one or more of:
  a configuration of the component associated with the alert;
  a time at which the alert occurred; or
  a type of the alert.

6. The computing system of claim 1,
wherein the plurality of second components providing Level-2 functionality for the O-RAN 5G infrastructure comprise a first plurality of second components and a second plurality of second components,
wherein to display the plurality of second icons, the processing circuitry is configured to:
  display a first icon of the plurality of second icons, the first icon comprising a single icon representing the first plurality of second components; and
  display a second plurality of second icons, each of the second plurality of second icons representing a single component of the second plurality of second components.

7. The computing system of claim 6, wherein the processing circuitry is further configured to:
receive, via the user interface, a selection of the first icon of the plurality of second icons; and
responsive to the selection of the first icon of the plurality of second icons, update the user interface to:
  display a third plurality of second icons, each of the third plurality of second icons representing a single component of the first plurality of second components; and
  display a fourth icon of the plurality of second icons, the fourth icon comprising a single icon representing the second plurality of second components.

8. The computing system of claim 1, wherein the processing circuitry is further configured to:
responsive to a selection of a second icon of the plurality of second icons, display, via the user interface, information associated with a component of the plurality of second components corresponding to the selected second icon.

9. The computing system of claim 1,
wherein the processing circuitry is further configured to display, via the user interface, a representation of a geographic location, and
wherein to display the plurality of first icons and the plurality of second icons, the processing circuitry is configured to position the plurality of first icons and the plurality of second icons on the representation of the geographic location.

10. The computing system of claim 1,
wherein to display the plurality of first icons and the plurality of second icons, the processing circuitry is configured to arrange the plurality of first icons and the plurality of second icons according to a hierarchy of respective components of the plurality of first components and the plurality of second components within the O-RAN 5G infrastructure.

11. The computing system of claim 1,
wherein to display the plurality of first icons and the plurality of second icons, the processing circuitry is configured to arrange the plurality of first icons and the plurality of second icons according to a hub-and-spoke model of respective components of the plurality of first components and the plurality of second components within the O-RAN 5G infrastructure.

12. The computing system of claim 1,
wherein to receive the selection of the first icon of the first plurality of icons, the processing circuitry is configured to receive a first selection of the first icon of the first plurality of icons, and
wherein the processing circuitry is further configured to:
  after displaying the second plurality of icons, receive, via the user interface, a second selection of the first icon of the first plurality of icons; and
  responsive to the second selection of the first icon, display, via the user interface, the first plurality of icons and not the second plurality of icons.

13. The computing system of claim 1, wherein the processing circuitry is further configured to:
receive via the user interface, one or more filtering criteria; and
responsive to receiving the one or more filtering criteria, display, via the user interface, a subset of the second plurality of icons, each icon of the subset of the second plurality of icons representing one or more of the plurality of second components that have one or more attributes matching the one or more filtering criteria.

14. A method comprising:
displaying, by processing circuitry and via a user interface, a first plurality of icons, each icon of the first plurality of icons representing a plurality of first components providing Level-1 functionality for an Open Radio Access Network (O-RAN) 5G infrastructure;
receiving, by the processing circuitry and via the user interface, a selection of a first icon of the plurality of icons; and
responsive to the selection of the first icon, displaying, by the processing circuitry and via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

15. The method of claim 14, further comprising:
receiving, by the processing circuitry and via the user interface, a selection of a second icon of the plurality of second icons;
responsive to the selection of the second icon, displaying, by the processing circuitry and via the user interface, a plurality of third icons, each icon of the plurality of third icons representing a plurality of third components providing Level-3 functionality for the O-RAN 5G infrastructure, the plurality of third components managed by a component of the plurality of second components corresponding to the selected second icon;
receiving, by the processing circuitry and via the user interface, a selection of a third icon of the plurality of third icons; and
responsive to the selection of the third icon of the plurality of third icons, displaying, by the processing circuitry and via the user interface, a plurality of fourth icons, each icon of the plurality of fourth icons representing a plurality of fourth components providing Level-4 functionality for the O-RAN 5G infrastructure, the plurality of fourth components managed by a component of the plurality of third components corresponding to the selected third icon.

16. The method of claim 14,
wherein the plurality of second components providing Level-2 functionality for the O-RAN 5G infrastructure comprise a first plurality of second components and a second plurality of second components,
wherein displaying the plurality of second icons further comprises:
  displaying a first icon of the plurality of second icons, the first icon comprising a single icon representing the first plurality of second components; and
  displaying a second plurality of second icons, each of the second plurality of second icons representing a single component of the second plurality of second components.

17. The method of claim 14,
wherein displaying the plurality of first icons and the plurality of second icons, further comprises arranging, by the processing circuitry, the plurality of first icons and the plurality of second icons according to a hub-and-spoke model of respective components of the plurality of first components and the plurality of second components within the O-RAN 5G infrastructure.

18. The method of claim 14,
wherein receiving the selection of the first icon of the first plurality of icons comprises receiving a first selection of the first icon of the first plurality of icons, and
wherein the method further comprises:
  after displaying the second plurality of icons, receiving, by the processing circuitry and via the user interface, a second selection of the first icon of the first plurality of icons; and
  responsive to the second selection of the first icon, displaying, by the processing circuitry via the user interface, the first plurality of icons and not the second plurality of icons.

19. The method of claim 14, further comprising:
  receiving by the processing circuitry and via the user interface, one or more filtering criteria; and
  responsive to receiving the one or more filtering criteria, displaying, by the processing circuitry and via the user interface, a subset of the second plurality of icons, each icon of the subset of the second plurality of icons representing one or more of the plurality of second components that have one or more attributes matching the one or more filtering criteria.

20. A non-transitory computer readable medium comprising instructions that, when executed, cause one or more programmable processors to:
  display, via a user interface, a plurality of first icons, each icon of the plurality of first icons representing a plurality of first components providing Level-1 functionality for an Open Radio Access Network (O-RAN) 5G infrastructure;
  receive, via the user interface, a selection of a first icon of the plurality of first icons; and
  responsive to the selection of the first icon, display, via the user interface, a plurality of second icons, each icon of the plurality of second icons representing a plurality of second components providing Level-2 functionality for the O-RAN 5G infrastructure, the plurality of second components managed by a component of the plurality of first components corresponding to the selected first icon.

* * * * *